US009332220B2

(12) United States Patent
Akimoto et al.

(10) Patent No.: US 9,332,220 B2
(45) Date of Patent: May 3, 2016

(54) APPARATUS, SYSTEM, AND METHOD OF MANAGING DATA, AND RECORDING MEDIUM

(71) Applicants: Yuya Akimoto, Tokyo (JP); Ryoji Shimamoto, Kanagawa (JP); Takahiro Asai, Kanagawa (JP); Yohei Yamamoto, Tokyo (JP); Kaoru Maeda, Kanagawa (JP)

(72) Inventors: Yuya Akimoto, Tokyo (JP); Ryoji Shimamoto, Kanagawa (JP); Takahiro Asai, Kanagawa (JP); Yohei Yamamoto, Tokyo (JP); Kaoru Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/469,932

(22) Filed: Aug. 27, 2014

(65) Prior Publication Data

US 2015/0062286 A1 Mar. 5, 2015

(30) Foreign Application Priority Data

Aug. 30, 2013 (JP) .................................. 2013-179748

(51) Int. Cl.
*H04N 7/14* (2006.01)
*H04N 7/15* (2006.01)

(52) U.S. Cl.
CPC . *H04N 7/147* (2013.01); *H04N 7/15* (2013.01)

(58) Field of Classification Search
CPC ......... H04N 7/141; H04N 7/147; H04N 7/15; H04N 7/155
USPC ............ 348/14.08, 14.11; 370/247; 379/67.1; 709/203, 206, 223; 358/1.15
See application file for complete search history.

(56) References Cited

U.S. PATENT DOCUMENTS 8,296,376 B2 * 10/2012 Goldberg ............. G06Q 10/107
709/206
8,614,819 B2 * 12/2013 Akimoto ............ H04N 1/00204
358/1.13

(Continued)

FOREIGN PATENT DOCUMENTS

JP 2012-191598 10/2012
JP 2013-085208 5/2013

(Continued)

OTHER PUBLICATIONS

Extended European Search Report issued on Feb. 10, 2015 in Application No. 14182232.0.

*Primary Examiner* — Gerald Gauthier
(74) *Attorney, Agent, or Firm* — Oblon, McClelland, Maier & Neustadt, L.L.P.

(57) ABSTRACT

A transmission management system stores association information that associates, for each one of a plurality of starting terminals, starting terminal identification information for identifying the starting terminal capable of requesting to start communication with one or more candidate counterpart terminals, and candidate counterpart terminal identification information for identifying each one of the one or more candidate counterpart terminals. In response to receiving a request for deleting at least one candidate counterpart terminal selected from the one or more candidate counterpart terminals, for at least one starting terminal selected from the plurality of starting terminals, the management system specifies candidate counterpart terminal identification information of the selected candidate counterpart terminal using the association information, and deletes the candidate counterpart terminal identification information of the selected candidate counterpart terminal from one or more candidate counterpart terminals being associated with the selected starting terminal.

20 Claims, 20 Drawing Sheets

(56) References Cited

U.S. PATENT DOCUMENTS

| | | | |
|---|---|---|---|
| 8,861,377 B2* | 10/2014 | Okuyama | H04L 65/1069 370/244 |
| 9,021,018 B2* | 4/2015 | Kiesel | H04L 67/104 709/203 |
| 9,037,645 B2* | 5/2015 | Czajka | G06Q 10/107 709/203 |
| 2007/0100944 A1* | 5/2007 | Ford | H04L 12/581 709/206 |
| 2010/0211634 A1* | 8/2010 | Song | G06Q 10/107 709/203 |
| 2012/0062764 A1* | 3/2012 | Shinozawa | G06F 17/30126 348/231.2 |
| 2012/0221702 A1* | 8/2012 | Umehara | H04L 12/1818 709/223 |
| 2013/0223292 A1 | 8/2013 | Okuyama et al. | |
| 2013/0278712 A1* | 10/2013 | Maeda | H04L 65/80 348/14.08 |
| 2015/0062286 A1* | 3/2015 | Akimoto | H04N 7/15 348/14.11 |
| 2015/0145947 A1* | 5/2015 | Akimoto | H04N 7/15 348/14.08 |

FOREIGN PATENT DOCUMENTS

| | | |
|---|---|---|
| WO | WO 2012/074124 A1 | 6/2012 |
| WO | WO 2012/086844 A1 | 6/2012 |

* cited by examiner

FIG. 8

| TERMINAL ID | PASSWORD |
|---|---|
| 01aa | aaaa |
| 01ab | abab |
| 01ac | acac |
| ... | ... |

FIG. 9

| TERMINAL ID | NAME | OPERATION STATE | DATE/TIME RECEIVED | IP ADDRESS |
|---|---|---|---|---|
| 01aa | AA TERMINAL | ONLINE (COMMUNICATION OK) | 2012.08.20.13:40 | 1.2.1.3 |
| 01ab | AB TERMINAL | OFFLINE | 2012.08.19.12:00 | 1.2.1.4 |
| ... | ... | ... | ... | ... |
| 01ba | BA TERMINAL | ONLINE (INTERRUPT) | 2012.08.20.13:45 | 1.2.2.3 |
| 01bb | BB TERMINAL | ONLINE (COMMUNICATION OK) | 2012.08.20.13:50 | 1.2.2.4 |
| ... | ... | ... | ... | ... |
| 01ca | CA TERMINAL | OFFLINE | 2012.08.20.12:45 | 1.3.1.3 |
| 01cb | CB TERMINAL | ONLINE (COMMUNICATING) | 2012.08.20.13:55 | 1.3.1.4 |
| ... | ... | ... | ... | ... |
| 01da | DA TERMINAL | ONLINE (COMMUNICATING) | 2012.08.18.12:45 | 1.3.2.3 |
| 01db | DB TERMINAL | ONLINE (COMMUNICATION OK) | 2012.08.20.12:45 | 1.3.2.4 |
| ... | ... | ... | ... | ... |

FIG. 10

| STARTING TERMINAL ID | CANDIDATE COUNTERPART TERMINAL ID |
|---|---|
| 01aa | 01ab, ⋯, 01ba, 01bb, ⋯, 01ca, 01cb |
| 01ab | 01aa, 01ca, 01cb |
| 01ba | 01aa, 01ab, 01ca, 01cb, 01da, 01db |
| … | … |

FIG. 11

| REQUEST SENDER TERMINAL ID | REQUEST DESTINATION TERMINAL ID |
|---|---|
| 01aa | 01dc |
| 01ab | 01ca |
| 01ab | 01da |
| … | … |

| ADMINISTRATOR ID | PASSWORD | MANAGEMENT TERMINAL ID | ADMINISTRATOR EMAIL ADDRESS | ATTRIBUTE INFO |
|---|---|---|---|---|
| 02A | AAAA | 01aa, 01ab, ... | admin02A@dev1.ricoh.co.jp | TOKYO OFFICE |
| 02B | BBBB | 01ba, 01bb, ... | admin02B@dev1.ricoh.co.jp | TOKYO OFFICE |
| 02C | CCCC | 01ca, 01cb, ... | admin02C@dev2.ricoh.co.jp | OSAKA OFFICE |
| ... | ... | ... | ... | ... |

FIG. 17

○ TERMINAL AUTHENTICATION:

TERMINAL ID [    ]

PASSWORD [    ]

[LOG IN]

● ADMINISTRATOR AUTHENTICATION:

ADMINISTRATOR ID [    ]

PASSWORD [    ]

[NEW REGISTRATION] [LOG IN]

FIG. 18

ADMINISTRATOR REGISTRATION:

ADMINISTRATOR ID [    ]

PASSWORD [    ]

PASSWORD (CONFIRM) [    ]

[REGISTER] [CANCEL]

FIG. 19

MANAGEMENT TERMINAL LIST:

| REGISTER TERMINAL | DELETE TERMINAL | REGISTER CANDIDATE TERMINAL | DELETE CANDIDATE TERMINAL | | LOG OUT |

| | NAME | TERMINAL ID | CANDIDATE TERMINAL ID |
|---|---|---|---|
| CA ☐ | | | |
| C1 ☐ | AA TERMINAL | 01aa | 01ab, ···, 01ba, 01bb,···, 01ca, 01cb |
| C2 ☐ | AB TERMINAL | 01ab | 01aa, 01ca, 01cb |
| C3 ☐ | AC TERMINAL | 01ac | 01aa |
| CN ☐ | ··· | ··· | ··· |

FIG. 20

MANAGEMENT TERMINAL REGISTRATION:

REGISTRATION TERMINAL ID  [          ]

REGISTRATION TERMINAL ID  [          ]

REGISTRATION TERMINAL ID  [          ]

[REGISTER] [CANCEL]

FIG. 27A

| ADMINISTRATOR ID | PASSWORD | ADMINISTRATOR EMAIL ADDRESS | ATTRIBUTE INFO |
|---|---|---|---|
| 02A | AAAA | admin02A@dev1.ricoh.co.jp | TOKYO OFFICE |
| 02B | BBBB | admin02B@dev1.ricoh.co.jp | TOKYO OFFICE |
| 02C | CCCC | admin02C@dev2.ricoh.co.jp | OSAKA OFFICE |
| ... | ... | ... | ... |

FIG. 27B

| ADMINISTRATOR ID | MANAGEMENT TERMINAL ID |
|---|---|
| 02A | 01aa |
| 02A | 01ab |
| 02B | 01ba |
| 02B | 01bb |
| 02C | 01ca |
| 02C | 01cb |
| ... | ... | dinates
APPARATUS, SYSTEM, AND METHOD OF MANAGING DATA, AND RECORDING MEDIUM

CROSS-REFERENCE TO RELATED APPLICATIONS

This patent application is based on and claims priority pursuant to 35 U.S.C. §119(a) to Japanese Patent Application No. 2013-179748, filed on Aug. 30, 2013, in the Japan Patent Office, the entire disclosure of which is hereby incorporated by reference herein.

BACKGROUND

1. Technical Field

The present invention relates to managing a candidate counterpart terminal for a transmission terminal.

2. Description of the Related Art

Transmission systems that perform a videoconference via a communication network such as the Internet have become popular in recent years due to a demand for reducing business trip costs and time. In such a transmission system, once communication between or among a plurality of transmission terminals starts, image data and sound data are transmitted and received, thereby realizing a videoconference.

In order to make it easier for a user to select a desired counterpart terminal from among candidate counterpart terminals for communication, a candidate list is displayed on a starting terminal that gives a request to start communication, thereby enabling the user to select a desired counterpart terminal. JP-2013-085208-A describes that, in the case of registering a new candidate counterpart terminal in the candidate list, a management server requests a transmission terminal serving as a new candidate counterpart terminal whether it is approved to be registered as a candidate counterpart terminal. If the transmission terminal serving as a new candidate counterpart terminal gives approval, a new candidate counterpart terminal is registered.

SUMMARY

Example embodiments of the present include a transmission management system stores association information that associates, for each one of a plurality of starting terminals, starting terminal identification information for identifying the starting terminal capable of requesting to start communication with one or more candidate counterpart terminals, and candidate counterpart terminal identification information for identifying each one of the one or more candidate counterpart terminals. In response to receiving a request for deleting at least one candidate counterpart terminal selected from the one or more candidate counterpart terminals, for at least one starting terminal selected from the plurality of starting terminals, the management system specifies candidate counterpart terminal identification information of the selected candidate counterpart terminal using the association information, and deletes the candidate counterpart terminal identification information of the selected candidate counterpart terminal from one or more candidate counterpart terminals being associated with the selected starting terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a conceptual diagram of a terminal authentication management database (DB), according to an example embodiment of the present invention;

FIG. 9 is a conceptual diagram of a terminal management DB, according to an example embodiment of the present invention;

FIG. 10 is a conceptual diagram of a candidate list management DB, according to an example embodiment of the present invention;

FIG. 11 is a conceptual diagram of a request management DB, according to an example embodiment of the present invention;

FIG. 17 is an example illustration of an authentication screen;

FIG. 18 is an example illustration of an administrator registration screen;

FIG. 19 is an example illustration of a management terminal list screen;

FIG. 20 is an example illustration of a management terminal registration screen;

FIGS. 27A and 27B are conceptual diagrams of an administrator DB according to another embodiment.

Figure 1:
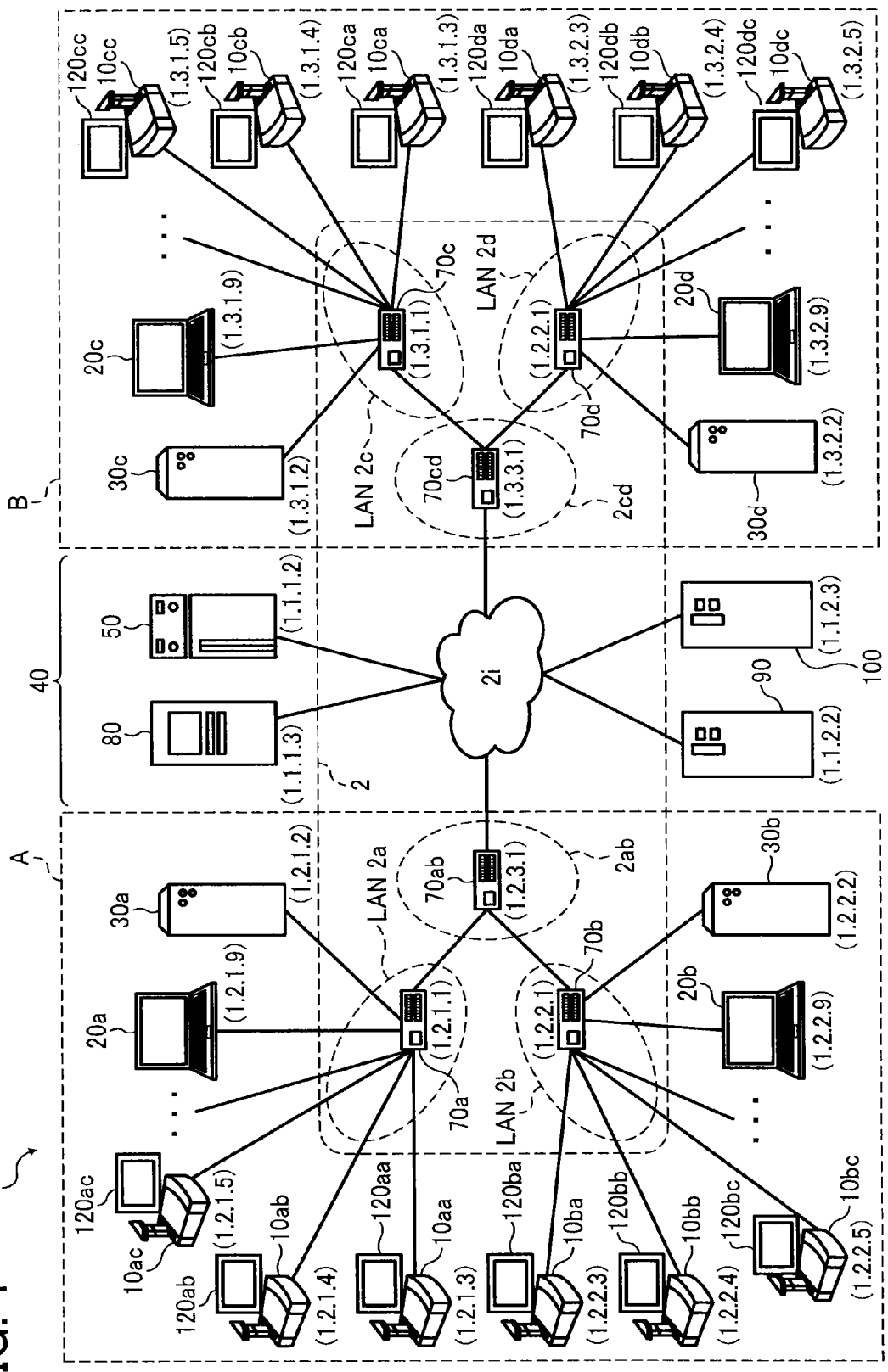
FIG. 1 is a schematic diagram illustrating a configuration of a transmission system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, embodiments of the present invention will be described using the drawings.

Referring to FIGS. 1 to 26, an embodiment of the present invention will be described.

<Overall Configuration of Embodiment>

Figure 2:
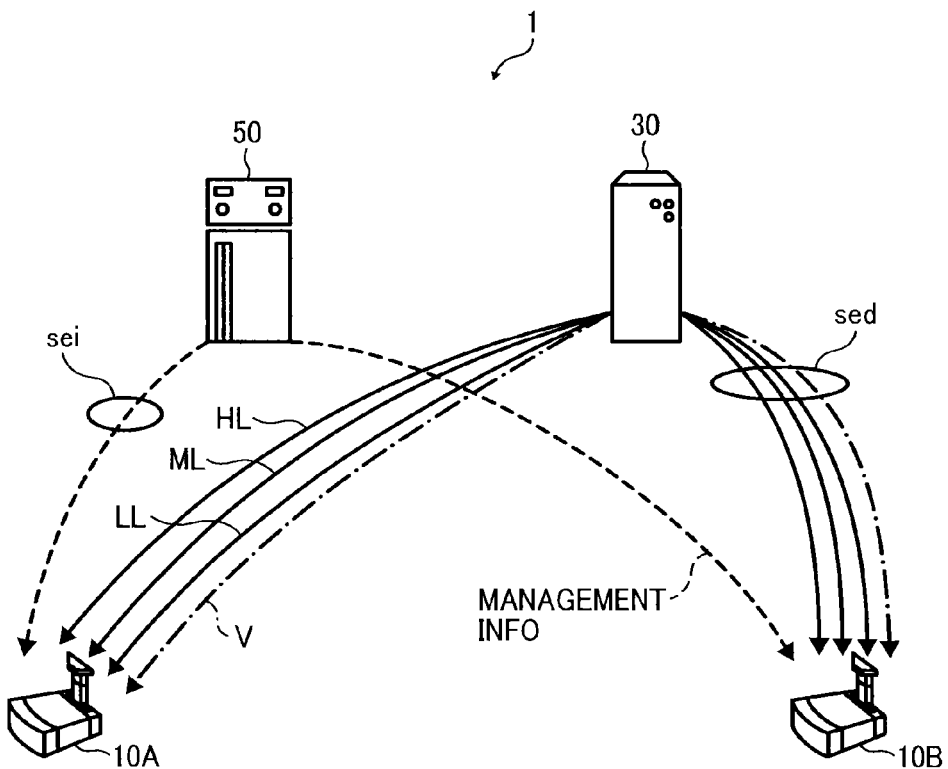
FIG. 2 is a conceptual diagram illustrating transmission and reception of image data, sound data, and various types of management information in the transmission system of FIG. 1.
Figure 3A:
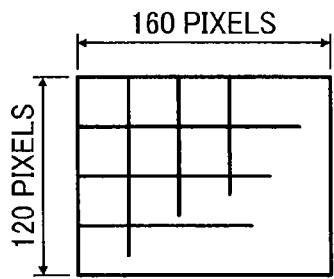
FIGS. 3A to 3C are conceptual diagrams describing the image quality of image data, according to an example embodiment of the present invention.
Figure 3B:
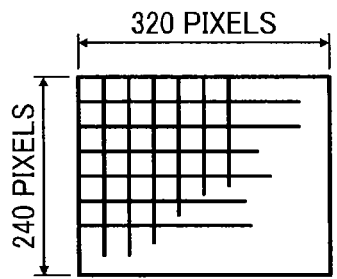
Figure 3C:
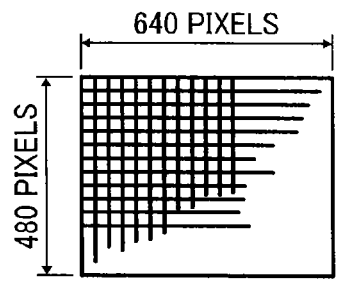

FIG. 1 is a schematic diagram of a transmission system 1 according to the embodiment of the present invention. FIG. 2 is a conceptual diagram illustrating a transmission/reception of image data, sound data, and various types of management information in the transmission system. FIGS. 3A to 3C are conceptual diagrams describing the image quality of image data.

The transmission system 1 of FIG. 1 includes a communication system that intercommunicates information or information reflecting feelings, for example, between terminals. In this example, the communication system is a system for intercommunicating information or information reflecting feelings, for example, between a plurality of communication terminals (one example of "transmission terminals") via a communication management system (one example of a "transmission management system" of the embodiment), and an example thereof includes a videoconference or teleconference system.

The transmission system 1 illustrated in FIG. 1 includes a plurality of transmission terminals (10*aa*, 10*ab*, ... ), displays (120*aa*, 120*ab*, ... ) for the respective transmission terminals (10*aa*, 10*ab*, ... ), a plurality of administrator terminals (20*a*, 20*b*, 20*c*, and 20*d*), a plurality of relay devices (30*a*, 30*b*, 30*c*, and 30*d*), a transmission management system 40, a program providing system 90, and a maintenance system 100. Further, the transmission management system 40 includes a terminal management system 50 and a counterpart registration system 80.

The plurality of transmission terminals 10 each transmit and receive image data and sound data serving as examples of content data. Note that another example of content data includes text data. In addition, it is sufficient for content data to include at least one of image data, sound data, and text data.

Hereinafter, an arbitrary one or ones of the plurality of transmission terminals (10*aa*, 10*ab*, ... ) is/are represented as a "transmission terminal(s) 10", an arbitrary one or ones of the plurality of displays (120*aa*, 120*ab*, ... ) is/are represented as a "display(s) 120", and an arbitrary one or ones of the plurality of relay devices (30*a*, 30*b*, 30*c*, and 30*d*) is/are represented as a "relay device(s) 30".

In this example, a transmission terminal 10 serving as a request sender that gives a request to start a teleconference or the like is represented as a "starting terminal", and a transmission terminal 10 serving as a counterpart terminal (relay destination) that is a request destination is represented as a "counterpart terminal". Further, a transmission terminal 10 that gives a request to register another transmission terminal 10 serving as a communication partner, namely, a counterpart, in a candidate list of the transmission terminal 10 is represented as a "request sender terminal", and this other transmission terminal 10 serving as a communication partner in this case is represented as a "request destination terminal".

In addition, as illustrated in FIG. 2, a management information session sei for transmitting and receiving various types of management information is established via the terminal management system 50 between a starting terminal 1 OA and a counterpart terminal 10B in the transmission system 1. In addition, four sessions for transmitting and receiving four items of data, namely, high-resolution image data, intermediate-resolution image data, low-resolution image data, and sound data, are established via a relay device 30 between the starting terminal 10A and the counterpart terminal 10B. Here, these four sessions are collectively indicated as an image/sound data session sed. Note that it is not always necessary to have the relay device 30 between the starting terminal 10A and the counterpart terminal 10B; the image/sound data session sed may be established directly between the starting terminal 10A and the counterpart terminal 10B.

Here, the resolution of images of image data handled in the embodiment will be described. There are the following images: a low-resolution image, serving as a base image, having horizontal 160 pixels by vertical 120 pixels, as illustrated in FIG. 3A; an intermediate-resolution image having horizontal 320 pixels by vertical 240 pixels, as illustrated in FIG. 3B; and a high-resolution image having horizontal 640 pixels by vertical 480 pixels, as illustrated in FIG. 3C. In the case of communicating via a narrow band, low-quality image data that only includes low-resolution image data serving as a base image is relayed. In the case of a relatively wide band, intermediate-quality image data including low-resolution image data serving as a base image and intermediate-resolution image data is relayed. In the case of a very wide band, high-quality image data including low-resolution image data serving as a base image, intermediate-resolution image data, and high-resolution image data is relayed.

The relay devices 30 illustrated in FIG. 1 relay content data between the plurality of transmission terminals 10. The terminal management system 50 collectively manages login authentication from the transmission terminals 10, the communication states, candidate lists, and so forth of the transmission terminals 10, and the communication states and so forth of the relay devices 30. Note that an image of image data may be a moving image or a still image, or may include both thereof.

A plurality of routers (70a, 70b, 70c, 70d, 70ab, and 70cd) select an optimal path for image data and sound data. Hereinafter, an arbitrary one or ones of the routers (70a, 70b, 70c, 70d, 70ab, and 70cd) is/are represented as a "router(s) 70".

The program providing system 90 includes a hard disk (HD) 204 described later. The HD 204 stores a transmission terminal program for causing a transmission terminal 10 to realize various functions (or for causing a transmission terminal 10 to function as various elements), and the transmission terminal program can be transmitted to the transmission terminal 10. In addition, the HD 204 of the program providing system 90 stores a relay device program for causing a relay device 30 to realize various functions (or for causing a relay device 30 to function as various elements), and the relay device program can be transmitted to the relay device 30.

Further, the HD 204 of the program providing system 90 stores a transmission management program for causing the terminal management system 50 to realize various functions (or for causing the terminal management system 50 to function as various elements), and the transmission management program can be transmitted to the terminal management system 50. In addition, the HD 204 of the program providing system 90 stores a counterpart registration program for causing the counterpart registration system 80 to realize various functions (or for causing the counterpart registration system 80 to function as various elements), and the counterpart registration program can be transmitted to the counterpart registration system 80. Note that the terminal management program and the counterpart registration program may be collectively referred to as a transmission management program.

The maintenance system 100 is a computer for performing maintenance, management, or conservation of at least one of the transmission terminals 10, the relay devices 30, the terminal management system 50, the counterpart registration system 80, and the program providing system 90. For example, in the case where the maintenance system 100 is located in one country, and the transmission terminals 10, the relay devices 30, the terminal management system 50, the counterpart registration system 80, or the program providing system 90 is/are located outside that country, the maintenance system 100 remotely performs, via a communication network 2, maintenance, management, or conservation of at least one of the transmission terminals 10, the relay devices 30, the terminal management system 50, the counterpart registration system 80, and the program providing system 90. In addition, the maintenance system 100 performs maintenance such as management of the model number, serial number, sales contact, maintenance checkup, or a past history of failures of at least one of the transmission terminals 10, the relay devices 30, the terminal management system 50, the counterpart registration system 80, and the program providing system 90.

In this example, the transmission terminals (10aa, 10ab, 10ac, . . . ), the relay device 30a, and the router 70a are connected to be communicable with each other by a local area network (LAN) 2a. The transmission terminals (10ba, 10bb, 10bc, . . . ), the relay device 30b, and the router 70b are connected to be communicable with each other by a LAN 2b. In addition, the LAN 2a and the LAN 2b are connected to be communicable with each other by a dedicated line 2ab including the router 70ab and are configured in a certain area A. For example, the area A is an office in Tokyo, the LAN 2a is configured in the first sales division, and the LAN 2b is configured in the second sales division.

Further, in this example, transmission terminals (10ca, 10cb, 10cc, . . . ), the relay device 30c, and the router 70c are connected to be communicable with each other by a LAN 2c. The transmission terminals (10da, 10db, 10dc, . . . ), the relay device 30d, and the router 70d are connected to be communicable with each other by a LAN 2d. In addition, the LAN 2c and the LAN 2d are connected to be communicable with each other by a dedicated line 2cd including the router 70cd and are configured in a certain area B. For example, the area B is an office in Osaka, the LAN 2c is configured in the first development division, and the LAN 2d is configured in the second development division. The area A and the area B are connected to be communicable with each other from the routers (70ab and 70cd), respectively, via the Internet 2i.

In addition, the terminal management system 50, the counterpart registration system 80, and the program providing system 90 are connected to be communicable with the transmission terminals 10 and the relay devices 30 via the Internet 2i. The terminal management system 50, the counterpart registration system 80, and the program providing system 90 may be located in the area A or the area B, or may be located in other areas.

In the embodiment, the communication network 2 of the embodiment includes the LAN 2a, the LAN 2b, the dedicated line 2ab, the Internet 2i, the dedicated line 2cd, the LAN 2c, and the LAN 2d. The communication network 2 may include not only a wired network, but also a network where communication is performed wirelessly, such as Wireless Fidelity (WiFi) or Bluetooth (registered trademark).

In FIG. 1, four digits indicated below each of the transmission terminals 10, each of the relay devices 30, the terminal management system 50, each of the routers 70, the counterpart registration system 80, and the program providing system 90 indicates an IP address in an abbreviated form in the general Internet Protocol version 4 (IPv4). For example, the IP address of the transmission terminal 10aa is "1.2.1.3". Although IPv6 may be used instead of IPv4, IPv4 is used in order to make the description simple.

Note that the transmission terminals 10 may be used not only for communication between offices or between different rooms in the same office, but also for communication within the same room or for outdoor-indoor communication or outdoor-outdoor communication. In the case where the transmission terminals 10 are used outside, wireless communication using a cellular phone communication network or the like is performed.

<Hardware Configuration>

Figure 4:
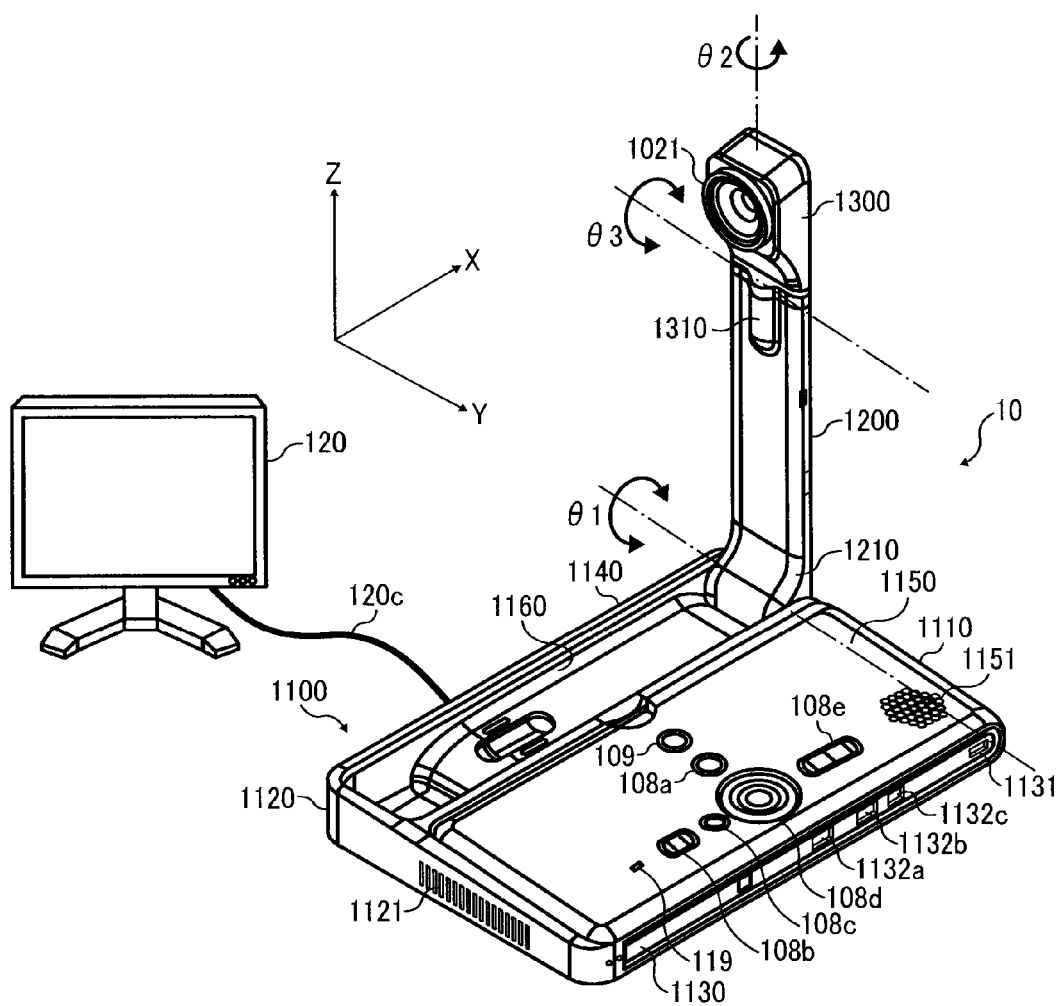
FIG. 4 is an external view of the transmission terminal of FIG. 1, according to an example embodiment of the present invention.

Next, referring to FIGS. 4 to 6, the hardware configuration of the embodiment will be described. FIG. 4 is an external view of the transmission terminal 10. The description will be given assuming that the longitudinal direction of the transmission terminal 10 is the X-axis direction, a direction orthogonal to the X-axis direction on one plane is the Y-axis direction, and a direction orthogonal to the X-axis direction and the Y-axis direction (vertical direction) is the Z-axis direction.

As illustrated in FIG. 4, the transmission terminal 10 includes a casing 1100, an arm 1200, and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes are formed. Accordingly, by driving of a cooling fan included in the casing 1100, air behind the transmission terminal 10 can be taken in via the inlet face and exhausted to the rear of the transmission terminal 10 via the exhaust face 1121. A right-side wall 1130 of the casing 1100 has a sound pickup hole 1131 formed thereon, and a built-in microphone 114, described later, is capable of picking up sound and noise.

An operation panel 1150 is formed toward the right-side wall 1130 of the casing 1100. The operation panel 1150 has a plurality of operation keys (108a to 108e) described later, a power switch 109 described later, and an alarm lamp 119 described later, which are formed thereon. In addition, the operation panel 1150 has a sound output face 1151 formed thereon, which is formed of a plurality of sound output holes for allowing output sound from a built-in a speaker 115 described later to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later are provided on the right-side wall 1130 of the casing 1100. A connection port for electrically connecting a cable 120c for a display 120 to the external device connection I/F 118 described later is provided toward the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210 and is configured to be rotatable in the vertical direction within the range of a tilt angle θ1 of 135 degrees with respect to the casing 1100. FIG. 4 indicates a state in which the tilt angle θ1 is 90 degrees.

The camera housing 1300 has a built-in camera 112 provided thereon, which will be described later, and the camera 112 can capture an image of a user, a document, a room, or the like. In addition, the camera housing 1300 has a torque hinge 1310 formed thereon. The camera housing 1300 is attached to the arm 1200 via the torque hinge 1310 and is configured to be rotatable in the vertical and horizontal directions within a range of a pan angle θ2 of ±180 degrees and a tilt angle θ3 of ±45 degrees with respect to the state illustrated in FIG. 4 serving as 0 degrees.

Since the relay devices 30, the terminal management system 50, the counterpart registration system 80, the program providing system 90, and the maintenance system 100 have the same appearance as that of a general server computer, descriptions of the outer appearances thereof are omitted.

Figure 5:
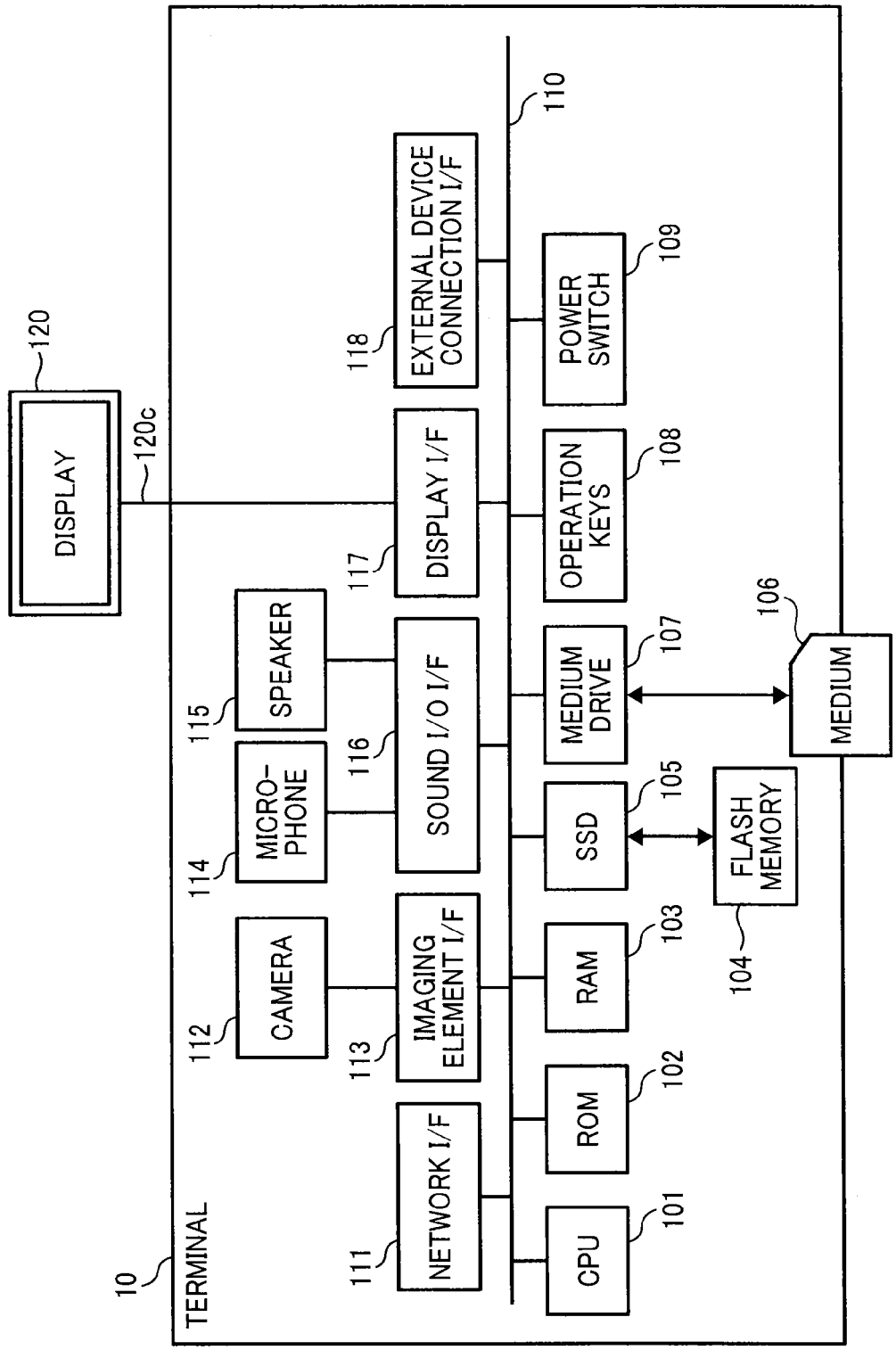
FIG. 5 is a hardware configuration diagram of the transmission terminal of FIG. 1, according to an example embodiment of the present invention.

FIG. 5 is a hardware configuration diagram of the transmission terminal 10. As illustrated in FIG. 5, the transmission terminal 10 of the embodiment includes a central processing unit (CPU) 101 that controls the overall operation of the transmission terminal 10, a read-only memory (ROM) 102 that stores a program used for controlling the CPU 101, such as an initial program loader (IPL), a random-access memory (RAM) 103 used as a work area for the CPU 101, a flash memory 104 that stores various types of data, such as the transmission terminal program, image data, and sound data, a solid state drive (SSD) 105 that controls reading/writing of various types of data from/to the flash memory 104 under control of the CPU 101, a medium drive 107 that controls reading/writing (storage) of data from/to a recording medium 106 such as a flash memory, the operation keys 108 operated in the case of, for example, selecting a counterpart terminal for the transmission terminal 10, the power switch 109 for turning ON/OFF the power of the transmission terminal 10, and a network interface (I/F) 111 for transmitting data using the communication network 2.

In addition, the transmission terminal 10 includes: the built-in camera 112, which captures an image of a subject and obtains image data under control of the CPU 101; an imaging element I/F 113 that controls driving of the camera 112; the built-in microphone 114, which receives an audio input; the built-in speaker 115, which outputs sound; a sound input/output I/F 116 that processes inputting/outputting of a sound signal between the microphone 114 and the speaker 115 under control of the CPU 101; a display I/F 117 that transmits image data to an external display 120 under control of the CPU 101; the external device connection I/F 118 connected to a connection port 1021g illustrated in FIG. 4 in order to connect various external devices; the alarm lamp 119, which indicates an abnormality of various functions of the transmission terminal 10; and a bus line 110 such as an address bus and a data bus for electrically connecting the above-described elements as illustrated in FIG. 5.

The display 120 is a display element formed of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the camera 112, the microphone 114, and the speaker 115 need not necessarily be included in the transmission terminal 10, and the transmission terminal 10 may be configured to be capable of connecting only an external camera, an external microphone, and an external speaker. In addition, the recording medium 106 is configured to be removable from the transmission terminal 10. In addition, a non-volatile memory that reads or writes data under control of the CPU 101 is not limited to the flash memory 104, and an electrically erasable and programmable read-only memory (EEPROM) may be used instead.

Further, the transmission terminal program may be stored in a file in an installable format or an executable format on a computer-readable recording medium such as the recording medium 106 and distributed. In addition, the transmission terminal program may be stored on the ROM 102, instead of the flash memory 104.

Figure 6:
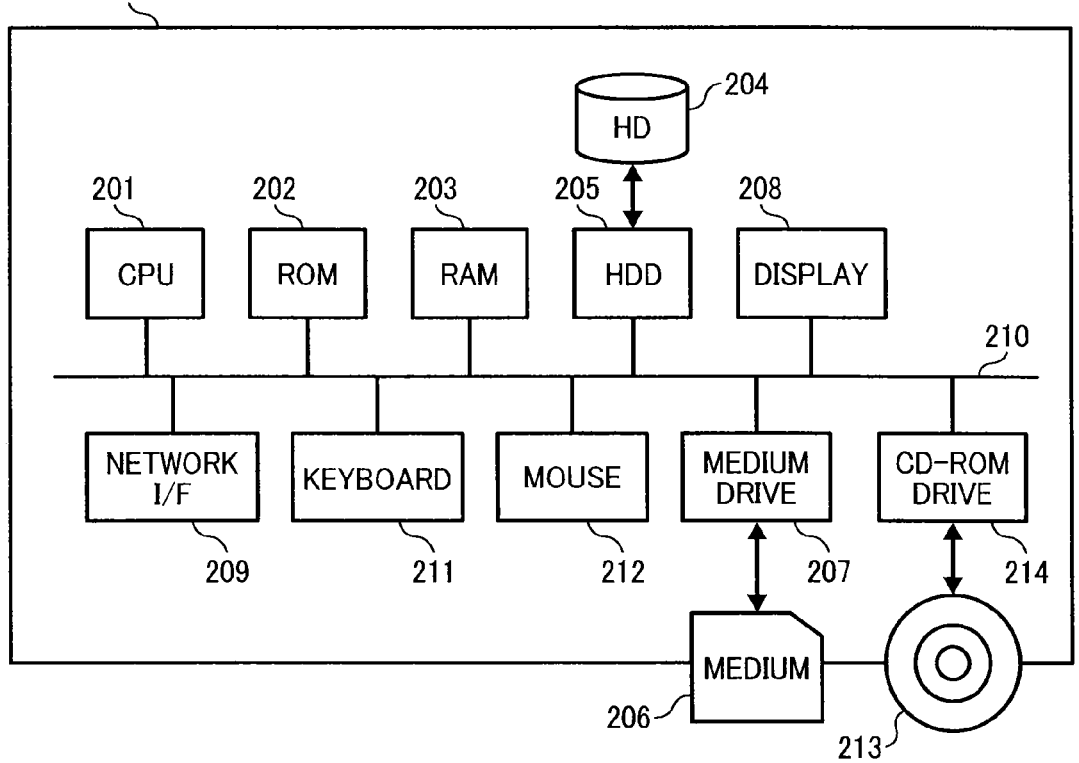
FIG. 6 is a hardware configuration diagram of a relay device, a terminal management system, a counterpart registration system, a program providing system, and a maintenance system of FIG. 1, according to an example embodiment of the present invention.

FIG. 6 is a hardware configuration diagram of any one of the relay device 30, the terminal management system 50, the counterpart registration system 80, the program providing system 90, and the maintenance system 100. For simplicity, the case for the terminal management system 50 is described below.

The terminal management system 50 includes a CPU 201 that controls the overall operation of the terminal management system 50, a ROM 202 that stores a program used for controlling the CPU 201, such as an IPL, a RAM 203 used as a work area for the CPU 201, an HD 204 that stores various types of data such as the terminal management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements.

Note that the terminal management program may be stored in a file in an installable format or an executable format on a computer-readable recording medium such as the recording medium 206 or the CD-ROM 213 and distributed. In addition, the terminal management program may be stored on any desired memory such as the ROM 202, instead of the HD 204.

In addition, since the relay devices 30 have a hardware configuration that is the same as or similar to that of the above-described terminal management system 50, a description thereof is omitted. Note that the HD 204 stores a relay device program for controlling the relay devices 30. Also in this case, the relay device program may be stored in a file in an installable format or an executable format on a computer-readable recording medium such as the recording medium 206 or the CD-ROM 213 and distributed. In addition, the relay device program may be stored on any desired memory such as the ROM 202, instead of the HD 204.

Further, since the counterpart registration system 80 has a hardware configuration that is the same as or similar to that of the above-described terminal management system 50, a description thereof is omitted. Note that the HD 204 stores a counterpart registration program for controlling the counterpart registration system 80. Also in this case, the counterpart registration program may be stored in a file in an installable format or an executable format on a computer-readable recording medium such as the recording medium 206 or the CD-ROM 213 and distributed. In addition, the counterpart registration program may be stored on any desired memory such as the ROM 202, instead of the HD 204.

In addition, since the program providing system 90 and the maintenance system 100 each have a hardware configuration that is the same as or similar to that of the above-described terminal management system 50, descriptions thereof are omitted. Note that the HD 204 stores a program providing program for controlling the program providing system 90. Also in this case, the program providing program may be recorded in a file in an installable format or an executable format on a computer-readable recording medium such as the recording medium 206 or the CD-ROM 213 and distributed. In addition, the program providing program may be stored on any desired memory such as the ROM 202, instead of the HD 204. In addition, the same applies to the maintenance system 100 and a maintenance program.

Note that each of the above-described programs may be stored on a computer-readable recording medium such as a compact disc recordable (CD-R), a digital versatile disk (DVD), or a Blu-ray disk, which serve as other examples of the above-described removable recording medium, and may be provided.

<Functional Configuration>

Figure 7:
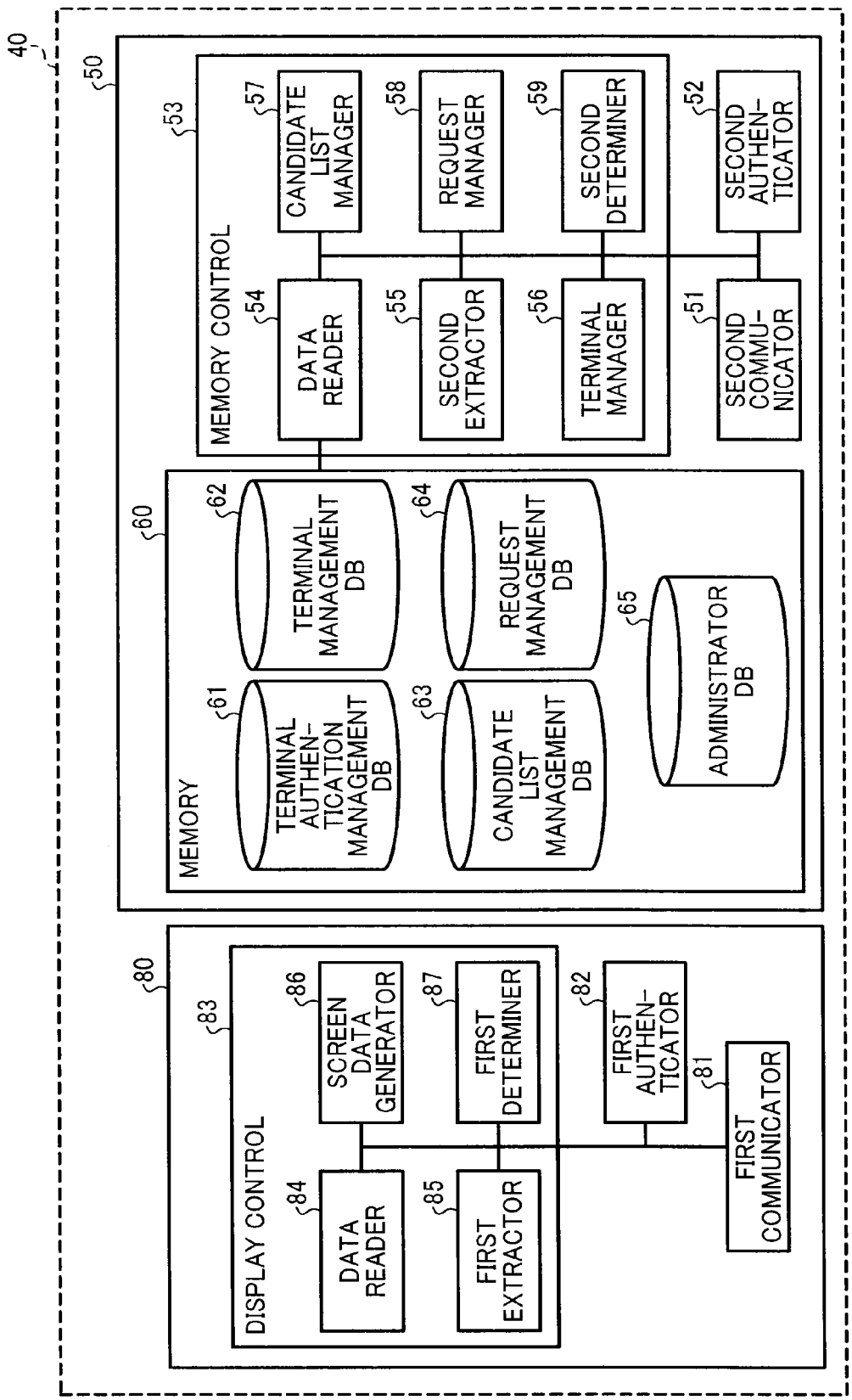
FIG. 7 is a functional block diagram of the terminal management system and the counterpart registration system of the transmission management system of FIG. 1, according to an example embodiment of the present invention.

Hereinafter, using FIGS. 7 to 12, the functional configuration of the terminal management system 50 and the counterpart registration system 80 in particular will be described. Note that FIG. 7 is a functional block diagram of the terminal management system 50 and the counterpart registration system 80 included in the transmission management system 40 of FIG. 1.

(Functional Configuration of Terminal Management System)

First, the terminal management system 50 will be described. With the hardware configuration illustrated in FIG. 6 that operates in cooperation with the terminal management program, the terminal management system 50 includes a second communicator 51, a second authenticator 52, a memory control 53, and a memory 60. The memory control 53 includes a data reader 54, a second extractor 55, a terminal manager 56, a candidate list manager 57, a request manager 58, and a second determiner 59. The memory 60 includes a terminal authentication management DB 61, a terminal management DB 62, a candidate list management DB 63, a request management DB 64, and an administrator DB 65.

FIG. 8 is a conceptual diagram of the terminal authentication management DB 61. The terminal authentication management DB 61 manages items of information indicating a terminal ID and a password, as items of association information that are associated with each other. The terminal ID is identification information for identifying a transmission terminal 10. The terminal ID (an example of terminal identification information) may be identification information stored in advance in the transmission terminal 10, or may be identification information input by the user of the transmission terminal 10 to the transmission terminal 10. The password is a password for the transmission terminal 10 to log in to the transmission management system 40 with the terminal ID. Note that records in the terminal authentication management DB 61 may have columns (fields) other than those described above.

FIG. 9 is a conceptual diagram of the terminal management DB 62. The terminal management DB 62 manages items of information indicating a terminal ID, name, operation state, date/time received, and the IP address of a terminal as items of association information that are associated with one another. The terminal ID is identification information for identifying a transmission terminal 10. The name is the name of the transmission terminal 10. Note that the name may be the name of the user of the transmission terminal 10, the name of a department to which the user belongs, or the like. The operation state is the most recent operation state of the transmission terminal 10. The date/time received is the date and time at which a login request from the transmission terminal 10 to the transmission management system 40 has been accepted. The IP address is the IP address of the transmission terminal 10. Note that records in the terminal management DB 62 may have columns other than those described above.

FIG. 10 is a conceptual diagram of the candidate list management DB 63. The candidate list management DB 63 manages the terminal ID of a starting terminal and the terminal ID of a candidate counterpart terminal that may be a counterpart terminal as items of association information that are associated with each other. Note that records in the candidate list management DB 63 may have columns other than those described above.

FIG. 11 is a conceptual diagram of the request management DB 64. The request management DB 64 manages the terminal ID of a request sender terminal and the terminal ID of a request destination terminal as items of association information that are associated with each other. The terminal ID of a request sender terminal is identification information for identifying a transmission terminal 10 that has sent a request for registering a candidate counterpart terminal. The terminal ID of a request destination terminal is identification information for identifying a transmission terminal 10 that has been requested by a transmission terminal 10 identified by the request sender terminal ID to be registered as a candidate counterpart terminal. Note that records in the request management DB 64 may have columns other than those described above.

Figures 12, 13:
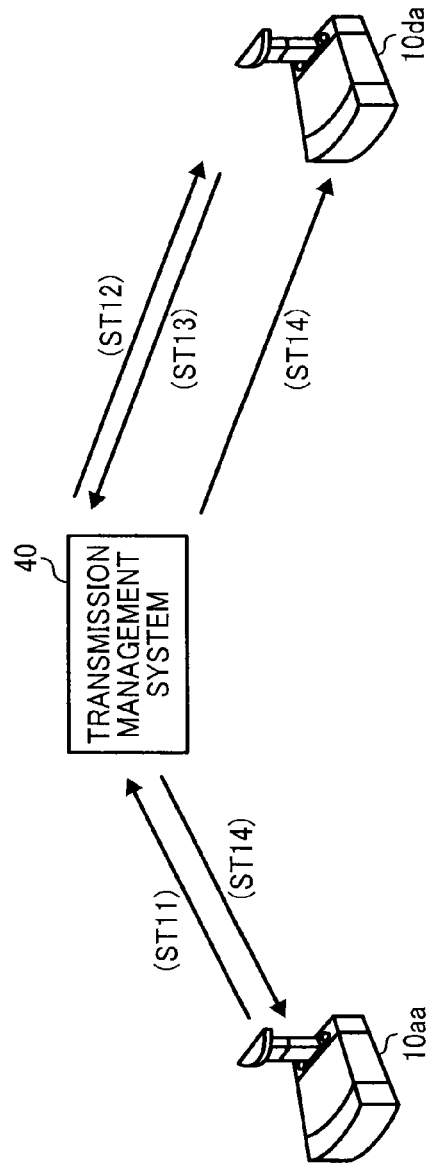
FIG. 12 is a conceptual diagram of an administrator DB, according to an example embodiment of the present invention.
FIG. 13 is a conceptual diagram illustrating operation of registering a candidate counterpart terminal, according to an example embodiment of the present invention.

FIG. 12 is a conceptual diagram of the administrator DB 65. The administrator DB 65 manages an administrator ID, password, the terminal ID of a management terminal, an administrator email address, and attribute information of an administrator as items of association information that are associated with one another. Note that, as association information, it is sufficient that at least the administrator ID, the terminal ID of a management terminal, and the attribute information of the administrator be associated with one another.

Among these items of information, the administrator ID is identification information for identifying the administrator of a transmission terminal 10. The administrator ID may be the name of the administrator. The password is a password for logging in to the transmission management system 40 with the administrator ID. The terminal ID of a management terminal is identification information for identifying a management terminal (transmission terminal 10) managed by the administrator. The administrator email address is the email address of the administrator. In this embodiment, the attribute information is affiliation information that indicates a department to which the administrator belongs in an organization such as a company, corporate title information indicating the corporate title of the administrator, authority information indicating the authority of the administrator, or the like. The attribute information may be any one of these items of information (affiliation information, corporate title information, and authority information), or may be information combining at least two thereof. Note that records in the administrator DB 65 may have columns other than those described above.

Also in the embodiment, referring to FIG. 1, an administrator A uses the administrator terminal 20a and manages a plurality of transmission terminals (10aa, 10ab, . . . ) connected to the LAN 2a as his/her management terminals. An administrator B uses the administrator terminal 20b and manages a plurality of transmission terminals (10ba, 10bb, . . . ) connected to the LAN 2b as his/her management terminals. An administrator C uses the administrator terminal 20c and manages a plurality of transmission terminals (10ca, 10cb, . . . ) connected to the LAN 2c as his/her management terminals. An administrator D uses the administrator terminal 20d and manages a plurality of transmission terminals (10da, 10db, . . . ) connected to the LAN 2d as his/her management terminals.

Referring back to FIG. 7, the second communicator 51 communicates with the transmission terminal 10 and other systems via the communication network 2.

The second authenticator 52 authenticates a transmission terminal 10 when the transmission terminal 10 tries to log in to the terminal management system 50 (transmission management system 40) in order to start communication with another transmission terminal 10. Specifically, the second authenticator 52 searches the terminal authentication management DB 61 of the memory 60 by using a terminal ID and a password included in login information received by the second communicator 51 as search keys. The second authenticator 52 determines whether the search keys match information in the terminal authentication management DB 61, thereby authenticating whether to permit login to the terminal management system 50.

The terminal manager 56 manages the operation state of the transmission terminal 10 that has given a login request to the transmission management system 40. The terminal manager 56 updates a record in the terminal management DB 62 that corresponds to the terminal ID of the transmission terminal 10, which has given the login request to the transmission management system 40. Specifically, in the case of successful login, the "operation state" is changed from offline to online (communication OK), and the "date/time received" and the "IP address" are updated.

The second extractor 55 searches the candidate list management DB 63 by using, for example, the terminal ID of the transmission terminal 10, which has given the login request to the transmission management system 40, as a search key, and reads a terminal ID registered as a candidate counterpart terminal for the transmission terminal 10, which has given the login request. In addition, the second extractor 55 searches the terminal management DB 62 by using the extracted terminal ID as a search key, and reads the operation state of a transmission terminal 10 for every extracted terminal ID. The read terminal ID and the operation state are transmitted to the transmission terminal 10, which has given the login request to the transmission management system 40, via the second communicator 51. With this process, a candidate list including a candidate counterpart terminal(s) is displayed on the display 120 of the transmission terminal 10, which has given the request. The user of the transmission terminal 10 selects a desired counterpart terminal from the candidate list, thereby establishing a session sed between the transmission terminals 10 and realizing communication between the transmission terminals 10.

Note that the session sed between the transmission terminals 10 may be established via the transmission management system 40 or may directly be established. In addition, the transmission terminals 10 can exchange content data through the session sed.

In addition, the second extractor 55 can also search the candidate list management DB 63 by using the terminal ID of the transmission terminal 10, which has given the login request to the transmission management system 40, as a search key, and extract the terminal ID of a starting terminal from a record in which the terminal ID of the transmission terminal 10, which has given the login request, is registered as the terminal ID of a candidate counterpart terminal. Accordingly, the second extractor 55 searches the terminal management DB 62 by using, as a search key, the terminal ID of a starting terminal that registers the transmission terminal 10, which has given the login request, as a candidate counterpart terminal, thereby extracting a corresponding operation state.

The request manager 58 adds, changes, and deletes a record to/in/from the request management DB 64.

The candidate list manager 57 adds, changes, or deletes a record to/in/from the candidate list management DB 63. For example, the candidate list manager 57 extracts a record in the candidate list management DB 63 in which the terminal ID of a request sender terminal managed in the request management DB 64 matches the terminal ID of a starting terminal in the candidate list management DB 63. The candidate list manager 57 adds the ID of a request destination terminal to the column of the terminal ID of a candidate counterpart terminal in the extracted record.

The data reader 54 performs processing to store data in the memory 60. In addition, the data reader 54 performs processing to read data stored in the memory 60.

The second determiner 59 determines whether a terminal ID and an administrator ID (first administrator ID) received by the second communicator 51 are associated with each other in the above-described association information (first determination). In addition, in the case where it has been determined by the first determination that there is no association, the second determiner 59 determines whether there is another administrator ID (second administrator ID) associated with this terminal ID in the association information (second determination). Further, in the case where it has been determined by the second determination that there is a second administrator ID, the second determiner 59 determines whether attribute information associated with the first administrator ID in the association information (first attribute information) is identical to attribute information associated with the second administrator ID in the association information (second attribute information) (third determination).

(Functional Configuration of Counterpart Registration System)

Next, the counterpart registration system 80 will be described. With the hardware configuration illustrated in FIG. 6 that operates in cooperation with the counterpart registration program, the counterpart registration system 80 includes a first communicator 81, a first authenticator 82, and a display control 83. Further, the display control 83 includes a data reader 84, a first extractor 85, a screen data generator 86, and a first determiner 87.

Among these elements, the first communicator 81, the data reader 84, and the first extractor 85 have functions that are the same as or similar to those of the second communicator 51, the data reader 54, and the second extractor 55, respectively, and hence descriptions thereof are omitted. Although the counterpart registration system 80 has no memory in this embodiment, the data reader 84 and the first extractor 85 can realize the same functions as those of the data reader 54 and the second extractor 55 by accessing the memory 60 of the terminal management system 50 via the communication network 2.

The first authenticator 82 authenticates a transmission terminal 10 or an administrator terminal 20 when the transmission terminal 10 or the administrator terminal 20 tries to log in to the counterpart registration system 80 (transmission management system 40) in order to add or delete a candidate counterpart terminal. Specifically, a request to add or delete a candidate counterpart terminal can be given not only from the transmission terminal 10, but also from the administrator terminal 20.

In addition, the first authenticator 82 searches the terminal authentication management DB 61 (or the administrator DB 65) of the memory 60 by using a terminal ID (or an administrator ID) and a password included in login information received by the first communicator 81 as search keys. The first authenticator 82 determines whether the search keys match information in the terminal authentication management DB 61 (or the administrator DB 65), thereby authenticating whether to permit login to the counterpart registration system 80 (transmission management system 40).

The screen data generator 86 generates an authentication screen (see FIG. 17), an administrator registration screen (see FIG. 18), a management terminal list screen (see FIG. 19), a management terminal registration screen (see FIG. 20), a candidate counterpart terminal registration screen (see FIG. 22), and the like. The screen data generator 86 generates a screen in, for example, HyperText Markup Language (HTML).

Next, using FIGS. 13 to 15, a plurality of patterns of a process of registering a candidate counterpart terminal managed in a candidate list will be described.

(First Pattern)

A first pattern is illustrated in FIG. 13, which illustrates a registration process in the case where the user of the transmission terminal 10*aa* wants to register the transmission terminal 10*da*, which is in a different organization (such as a different "office"), as a candidate counterpart terminal in a candidate list of the transmission terminal 10*aa*. Note that FIG. 13 is a conceptual diagram illustrating an example of a candidate counterpart terminal registration process.

First, the transmission terminal 10*aa* transmits to the transmission management system 40 a candidate counterpart terminal registration request indicating a request to register the transmission terminal 10*da* as a candidate counterpart terminal for the transmission terminal 10*aa* (ST11). Next, the transmission management system 40 transmits to the transmission terminal 10*da* an approval request indicating a request for approval in order to register the transmission terminal 10*da* as a candidate counterpart terminal for the transmission terminal 10*aa* (ST12). In response to this, the transmission terminal 10*da* transmits a response indicating approval or disapproval to the transmission management system 40 (ST13). In the case of reception of a response indicating approval, the transmission management system 40 registers the transmission terminal 10*da* as a candidate counterpart terminal for the transmission terminal 10*aa* in the candidate list management DB 63, and transmits to the transmission terminal 10*aa* and the transmission terminal 10*da* a registration completion notification indicating that counterpart registration has been completed (ST14).

(Second Pattern)

Figure 14:
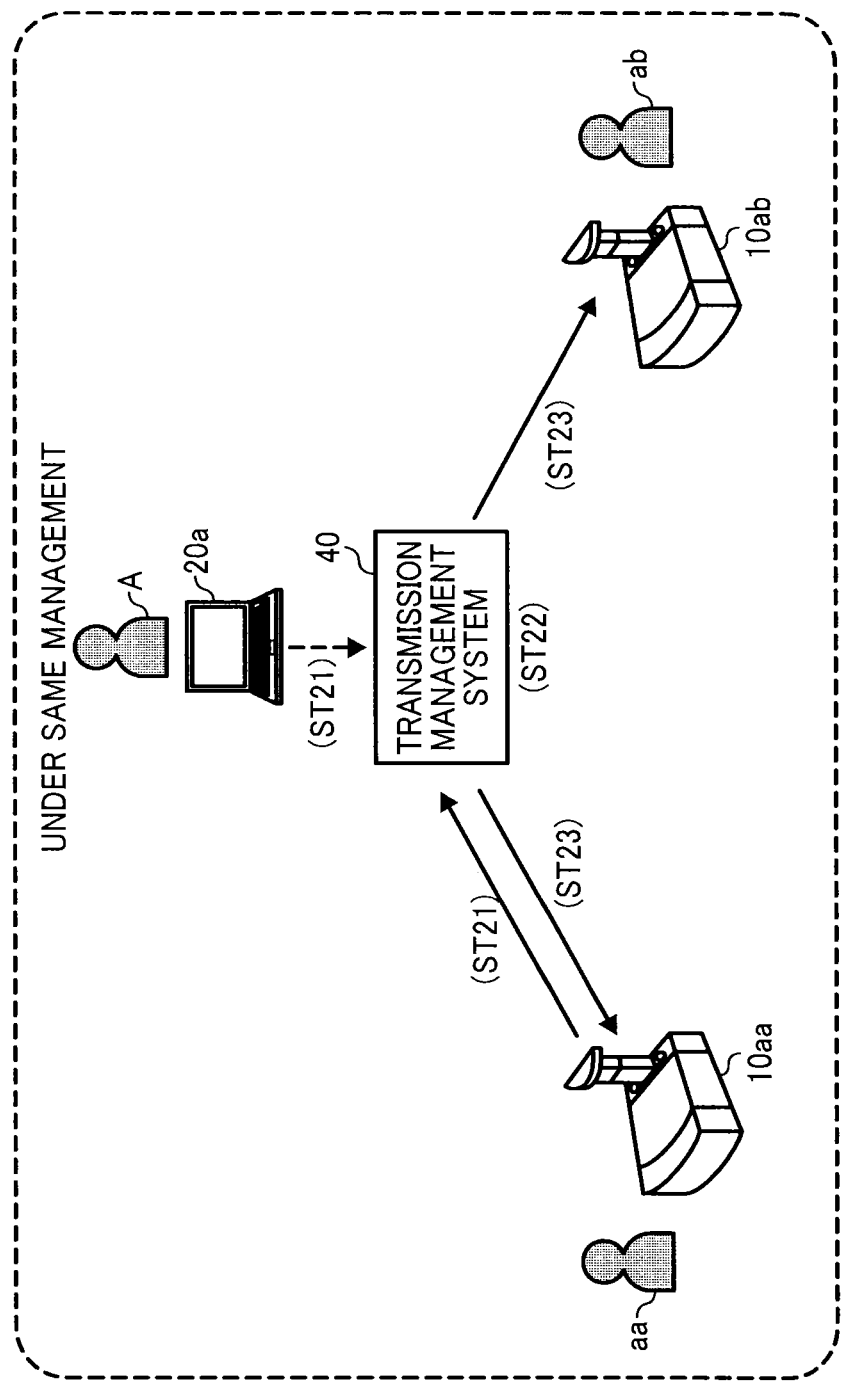
FIG. 14 is a conceptual diagram illustrating operation of registering a candidate counterpart terminal, according to an example embodiment of the present invention.

A second pattern is illustrated in FIG. 14, which illustrates a registration process in the case where the user of the transmission terminal 10*aa* (first user aa) wants to register the transmission terminal 10*ab*, which is in the same organization (such as the same office), as a candidate counterpart terminal in a candidate list of the transmission terminal 10*aa*. Note that FIG. 14 is a conceptual diagram illustrating an example of a candidate counterpart terminal registration process.

First, the transmission terminal 10aa transmits to the transmission management system 40 a candidate counterpart terminal registration request indicating a request to register the transmission terminal 10ab as a candidate counterpart terminal for the transmission terminal 10aa (ST21). Next, the transmission management system 40 determines whether the transmission terminal 10aa, which is a request sender terminal, and the transmission terminal 10ab, which is a request destination terminal, are management terminals of the same administrator A (transmission terminals under management of the administrator A) (ST22). Accordingly, in the case where the transmission terminal 10aa and the transmission terminal 10ab are management terminals of the same administrator A, the transmission management system 40 registers the transmission terminal 10ab as a candidate counterpart terminal for the transmission terminal 10aa in the candidate list management DB 63 without especially transmitting an approval request to the transmission terminal 10ab, as in ST 12 described above, and transmits to the transmission terminal 10aa and the transmission terminal 10ab a registration completion notification indicating that counterpart registration has been completed (ST23).

Note that a candidate counterpart terminal registration request indicated in ST21 may be given by the administrator A from the administrator terminal 20a to the transmission management system 40. In addition, in the case where the administrator A gives a candidate counterpart terminal registration request, the administrator A may collectively give candidate counterpart terminal registration requests from a plurality of transmission terminals 10.

(Third Pattern)

Figure 15:
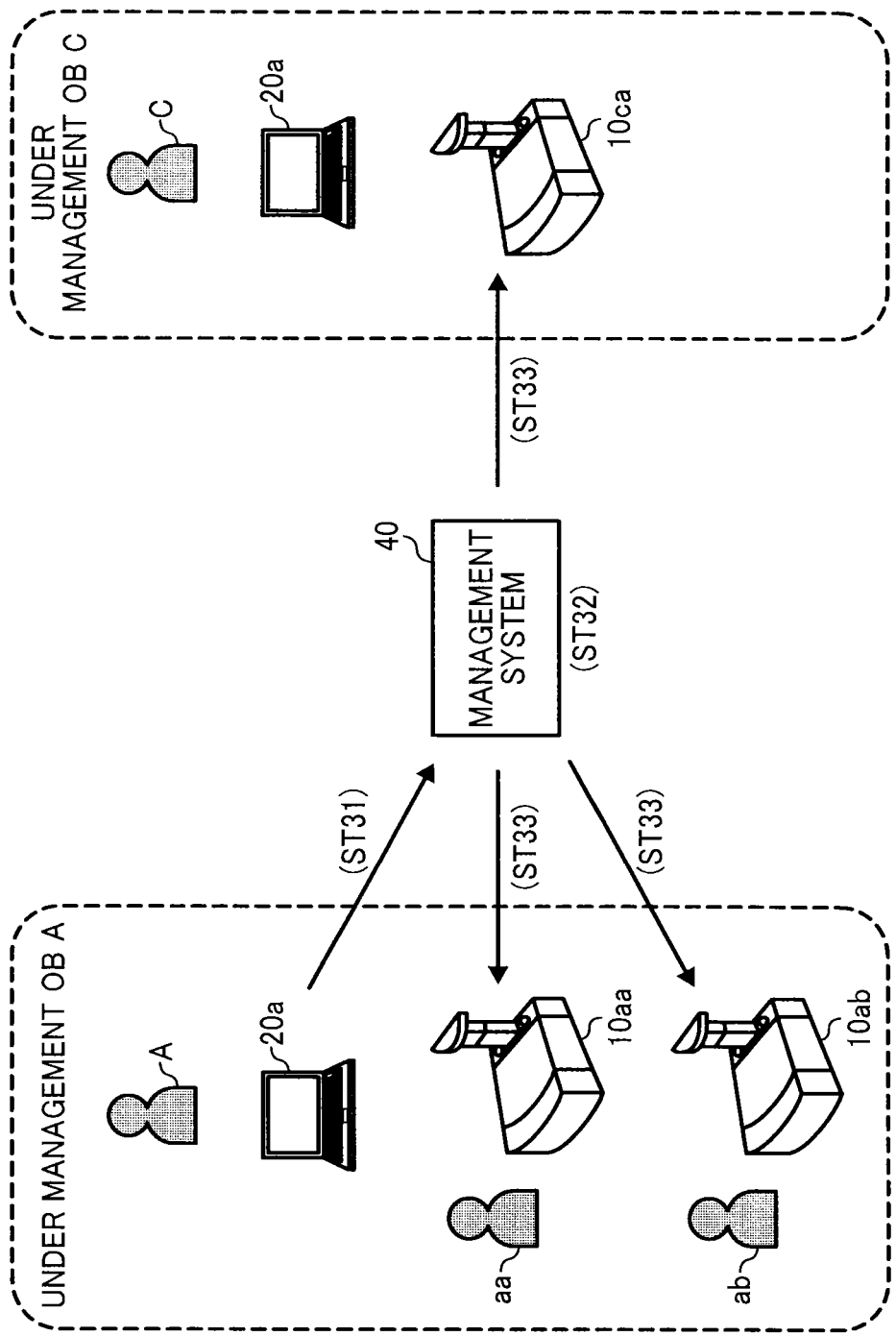
FIG. 15 is a conceptual diagram illustrating operation of deleting a candidate counterpart terminal, according to an example embodiment of the present invention.

A third pattern is illustrated in FIG. 15, which illustrates a deletion process in the case where the administrator (administrator A) of the transmission terminal 10aa and the transmission terminal 10ab, wants to delete a candidate counterpart terminal that is the transmission terminal 10ca under management of another administrator (administrator C) collectively from candidate lists of the transmission terminal 10aa and the transmission terminal 10ab under management of the administrator A. Note that FIG. 15 is a conceptual diagram illustrating an example of a candidate counterpart terminal deletion process.

First, the administrator terminal 20a transmits to the transmission management system 40 a candidate counterpart terminal deletion request indicating a request to delete a candidate counterpart terminal that is the transmission terminal 10ca collectively from the candidate lists of the transmission terminal 10aa and the transmission terminal 10ab (ST31). Next, the transmission management system 40 deletes a candidate counterpart terminal that is the transmission terminal 10ca collectively from the candidate lists of the transmission terminal 10aa and the transmission terminal 10ab (ST32). In addition, the transmission management system 40 collectively deletes candidate counterpart terminals that are the transmission terminal 10aa and the transmission terminal 10ab from a candidate list of the transmission terminal 10ca. Accordingly, the administrator A collectively deletes the candidate counterpart terminals even when each of the user (first user aa) of the transmission terminal 10aa and the user (second user ab) of the transmission terminal 10ab does not give a candidate counterpart terminal deletion request, and the administrator A transmits to the transmission terminals (10aa, 10ab, and 10ca) a deletion completion notification indicating that counterpart deletion has been completed (ST33).

<Example Operation>

Figure 16:
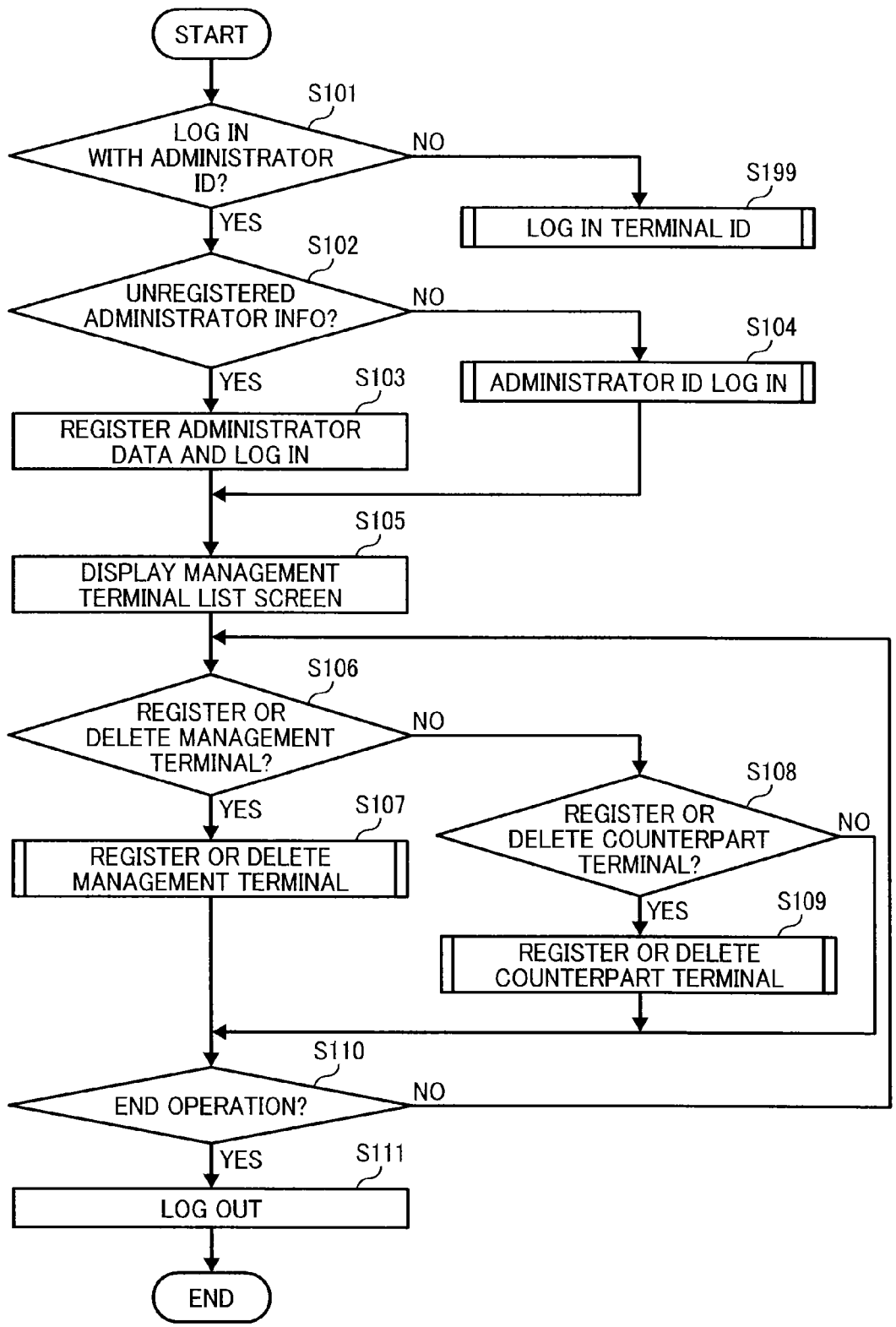
FIG. 16 is a flowchart illustrating operation of managing a candidate counterpart terminal, performed by the transmission management system of FIG. 1, according to an example embodiment of the present invention.

Next, referring to FIGS. 16 to 27, example operation of managing a candidate counterpart terminal will be described. FIG. 16 is a flowchart illustrating operation of managing performed by the transmission management system 40.

First, the first authenticator 82 of the counterpart registration system 80 determines whether a login request given with an administrator ID from an administrator terminal 20 operated by an administrator has been accepted via the communication network 2 (step S101). In the case where a login request given with an administrator ID has been accepted (Yes in step S101), the operation proceeds to step S102. In the case where no login request given with an administrator ID has been accepted (a login request given from a user using a terminal ID has been accepted) (No in step S101), a login process using the terminal ID is performed (step S199). In this example, a transmission terminal 10 can only perform a process of registering a candidate counterpart terminal in a candidate list of itself, that is a candidate list of the transmission terminal 10. An administrator terminal, operated by the administrator, can perform a process of registering a candidate counterpart terminal in all the candidate lists of management terminals (transmission terminals 10 under management of the administrator).

FIG. 17 is a conceptual diagram of an authentication screen of the transmission management system 40. Prior to a login request in step S101, the screen data generator 86 displays, via the first communicator 81, an authentication screen illustrated by way of example in FIG. 17 on the administrator terminal 20 operated by the administrator.

Items of screen data illustrated in FIGS. 17 to 25 are held by the screen data generator 86 itself. Alternatively, these items of screen data illustrated in FIGS. 17 to 25 may be stored in the memory 60, and the data reader 84 may read these items of screen data from the memory 60 in response to a command from the screen data generator 86.

Referring back to FIG. 16, in the case where it has been determined in step S101 described above that a login request has been given with an administrator ID (Yes in step S101), the first authenticator 82 determines whether administrator information, such as the administrator ID or password, is unregistered in the administrator DB 65 (step S102). In the case where administrator information is registered in the administrator DB 65 (No in step S102), the first authenticator 82 permits login (step S104). In contrast, in the case where administrator information is unregistered in the administrator DB 65 (Yes in step S102), the screen data generator 86 displays, via the first communicator 81, a registration screen on the administrator terminal 20 operated by the administrator, and, after administrator information input to the registration screen is registered in the administrator DB 65, the administrator logs in to the counterpart registration system 80 (step S103). An example of the case in which administrator information is unregistered in the administrator DB 65 is, for example, the case in which the administrator is registered for the first time using an initial setting password.

FIG. 18 is a conceptual diagram of an administrator registration screen. In step S103, for example, the administrator registration screen illustrated in FIG. 18 is displayed on the administrator terminal 20.

Referring back to FIG. 16, the screen data generator 86 generates a management terminal list screen illustrated in FIG. 19, and the first communicator 81 transmits data of the management terminal list screen to the administrator terminal 20, thereby displaying the screen (step S105). FIG. 19 is a conceptual diagram of the management terminal list screen. The management terminal list screen indicates a list of transmission terminals 10 managed by the administrator. The management terminal list screen is generated from terminal IDs and names in the terminal management DB 62, and the terminal ID of a starting terminal (identical to a corresponding one of the terminal IDs in the terminal management DB 62) and the terminal ID of a candidate counterpart terminal in the candidate list management DB 63.

In order to generate the management terminal list screen illustrated in FIG. 19, specifically the screen data generator 86 searches the administrator DB 65 by using the administrator ID accepted by the counterpart registration system 80 as a search key, and obtains the terminal ID(s) of a transmission terminal(s) 10 associated with the administrator ID. Accordingly, a transmission terminal(s) 10 managed by a specific administrator can be specified. Further, the first extractor 85 searches the candidate list management DB 63 for the terminal ID of a starting terminal by using each of the obtained terminal IDs as a search key, and obtains the terminal ID of a candidate counterpart terminal associated with each of the obtained terminal IDs. In addition, the first extractor 85 searches the terminal management DB 62 by using the terminal IDs obtained as described above as search keys, and obtains a name associated with each of the obtained terminal IDs. In this manner, the screen data generator 86 can generate a management terminal list screen on the basis of the information obtained by the first extractor 85.

On the management terminal list screen, the following buttons are displayed including a "register (management) terminal" button for newly registering a transmission terminal 10 as a management terminal, a "delete (management) terminal" button for deleting, from management terminals, a transmission terminal 10 that has already been registered as a management terminal, a "register candidate (counterpart) terminal" button for newly registering a transmission terminal as a candidate counterpart terminal, and a "delete a candidate (counterpart) terminal" button for deleting, from candidate counterpart terminals, a transmission terminal 10 that has already been registered as a candidate counterpart terminal.

In addition, for each terminal ID on the management terminal list screen, a check box (C1, C2, C3, or CN) for selecting that terminal ID is displayed. Further, a check box CA for collectively selecting all the terminal IDs is displayed. In addition, a "logout" button for logging out is displayed on the management terminal list screen. Each check box or each button is selected by pressing that box or button by the administrator.

Next, the screen data generator 86 determines whether the "register (management) terminal" button or the "delete (management) terminal" button has been selected at the administrator terminal 20 (step S106). In the case where the "register (management) terminal" button or the "delete (management) terminal" button has been selected (Yes in step S106), a later-described (Management Terminal Registration and Deletion Process) is performed (step S107) to register or delete a management terminal. In contrast, in the case where neither the "register (management) terminal" button nor the "delete (management) terminal" button has been selected (No in step S106), the operation proceeds to step S108.

Next, the screen data generator 86 determines whether the "register candidate counterpart terminal" button or the "delete candidate counterpart terminal" button has been selected on the administrator terminal 20 side (step S108). In the case where the "register candidate counterpart terminal" button or the "delete candidate counterpart terminal" button has been selected (Yes in step S108), a later-described (Candidate Counterpart Terminal Registration and Deletion Process) is performed (step S109) to register or delete a candidate counterpart terminal. In contrast, in the case where neither the "register candidate counterpart terminal" button nor the "delete candidate counterpart terminal" button has been selected (No in step S108), the operation proceeds to step S110.

Next, the screen data generator 86 determines whether the operation by the administrator ends by determining whether the "logout" button has been selected on the administrator terminal 20 side (step S110). In the case where the "logout" button has been selected (Yes in step S110), the counterpart registration system 80 permits the administrator terminal 20 to log out (step S111). In the case where the "logout" button has not been selected (No in step S110), the operation returns to step S106.

(Management Terminal Registration and Deletion Process)

Figure 21:
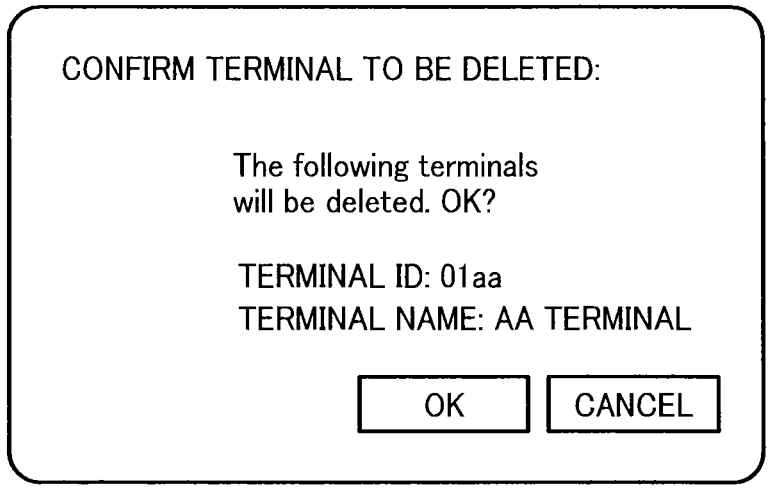
FIG. 21 is an example illustration of a confirmation screen for management terminal deletion.
Figure 25:
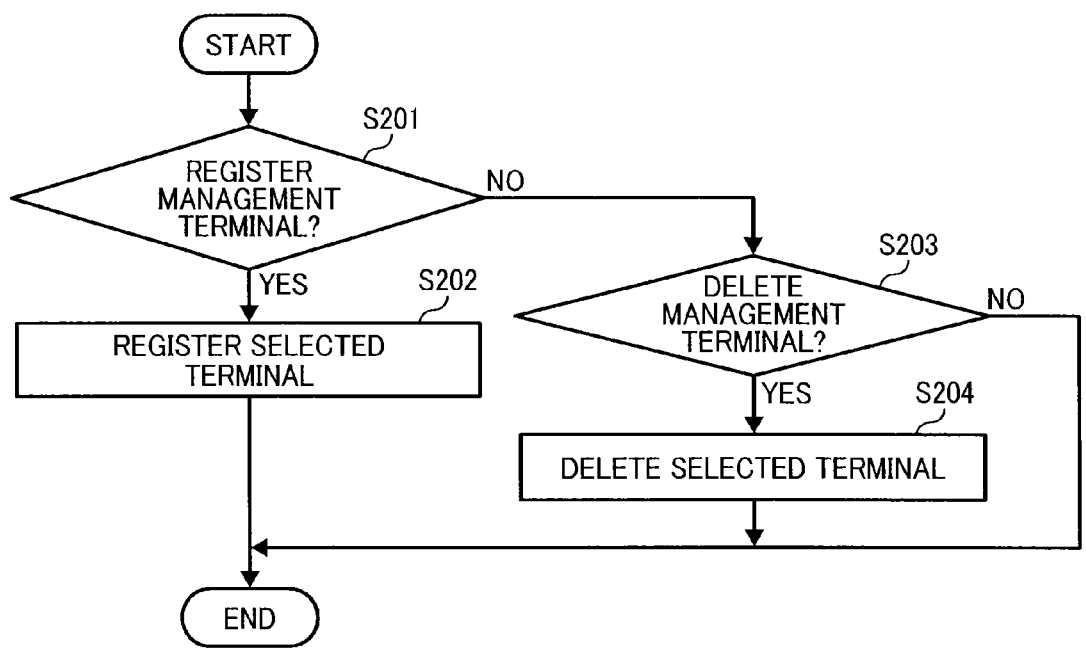
FIG. 25 is a flowchart illustrating a management terminal registration and deletion process.

Next, referring to FIGS. 19 to 21 and 25, the management terminal registration and deletion process in step S107 will be described. FIG. 20 is a conceptual diagram of a management terminal registration screen. FIG. 21 is a conceptual diagram of a confirmation screen for management terminal deletion. FIG. 25 is a flowchart illustrating the management terminal registration and deletion process.

Referring to FIG. 25, the first determiner 87 determines whether to register a management terminal by determining whether the "register (management) terminal" button has been selected or the "delete (management) terminal" button has been selected by the administrator on the management terminal list screen illustrated in FIG. 19 (step S201). In the case where the "register (management) terminal" button has been selected (Yes in step S201), the screen data generator 86 transmits data of a management terminal registration screen such as the screen illustrated in FIG. 20 to the administrator terminal 20 via the first communicator 81.

In response to this, the administrator terminal 20 displays the management terminal registration screen such as the screen illustrated in FIG. 20. On the management terminal registration screen, a plurality of "registration terminal ID" input fields for inputting the terminal ID of a transmission terminal 10 desired by the administrator to be newly registered as the administrator's management terminal are displayed. When the administrator inputs the terminal ID of a transmission terminal 10 in one of the "registration terminal ID" input fields and presses a "register" button, the administrator terminal 20 transmits to the counterpart registration system 80 a registration request including the terminal ID input in the "registration terminal ID" input field and the administrator ID of the administrator who has input the terminal ID. Accordingly, the first communicator 81 of the counterpart registration system 80 receives the registration request. The data reader 84 adds, in the administrator DB 65 of the terminal management system 50, the terminal ID input as the registration terminal ID to a terminal ID column in a record including the administrator ID used in the login process in step S101 described above (step S202).

In the case of not registering a management terminal (No in step S201), the first determiner 87 determines whether to delete a management terminal 10 (step S203). In the case of deleting a management terminal (Yes in step S203), the screen data generator 86 transmits, via the first communicator 81, a deletion request including a terminal ID checked (selected) in its check box (CA, C1 to CN) in FIG. 19 and the administrator ID of the administrator who has checked the check box to the terminal management system 50. Accordingly the data reader 54 of the terminal management system 50 deletes the terminal ID requested to be deleted, from a record in the administrator DB 65 in which the administrator ID used in the login process is included (step S204). In the case of not deleting a transmission terminal 10 (No in step S203), the operation ends. In addition, in the process at S203, the screen data generator 86 displays, via the first communicator 81, the confirmation screen for management terminal deletion, which is illustrated in FIG. 21, on the administrator terminal 20. FIG. 21 illustrates the confirmation screen for management terminal deletion. In this case, when the administrator presses an "OK" button, the process in step S204 described above is executed; and, when the administrator presses a "cancel" button, the process in step S204 described above is not executed.

Although an example in which the administrator inputs a terminal ID has been described using FIG. 20, the embodiment is not limited thereto, and a terminal ID may be input by selecting a file in which the terminal ID is written (such as by selecting a path for the screen data generator 86 to refer to that file).

(Candidate Counterpart Terminal Registration and Deletion Process)

Figure 22:
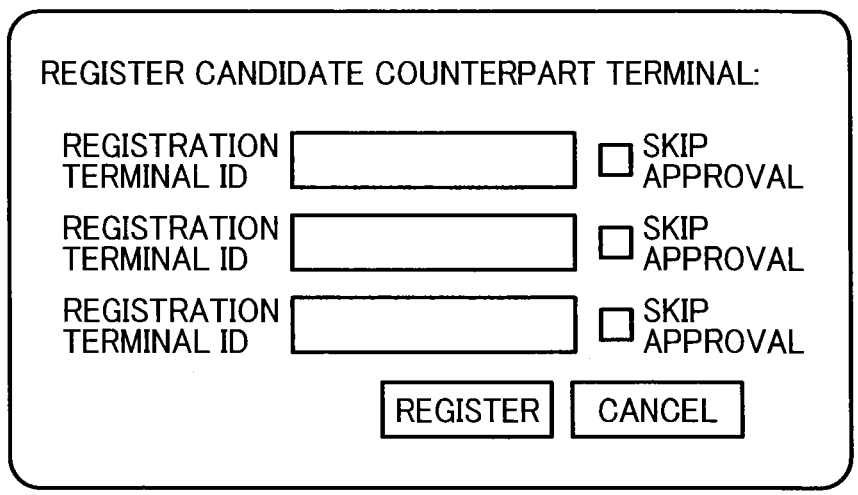
FIG. 22 is an example illustration of a candidate counterpart terminal registration screen.
Figure 23:
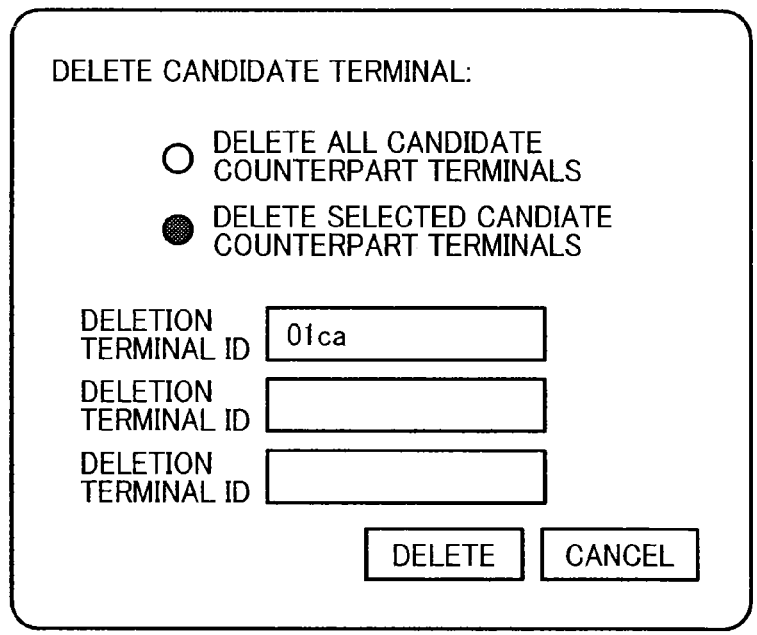
FIG. 23 is an example illustration of a candidate counterpart terminal deletion screen.
Figure 24:
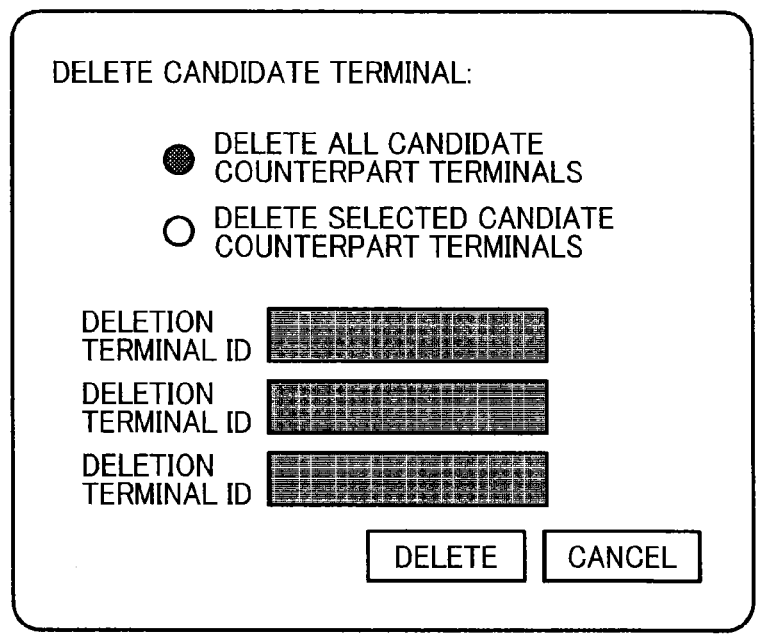
FIG. 24 is an example illustration of the candidate counterpart terminal deletion screen.
Figure 26A:
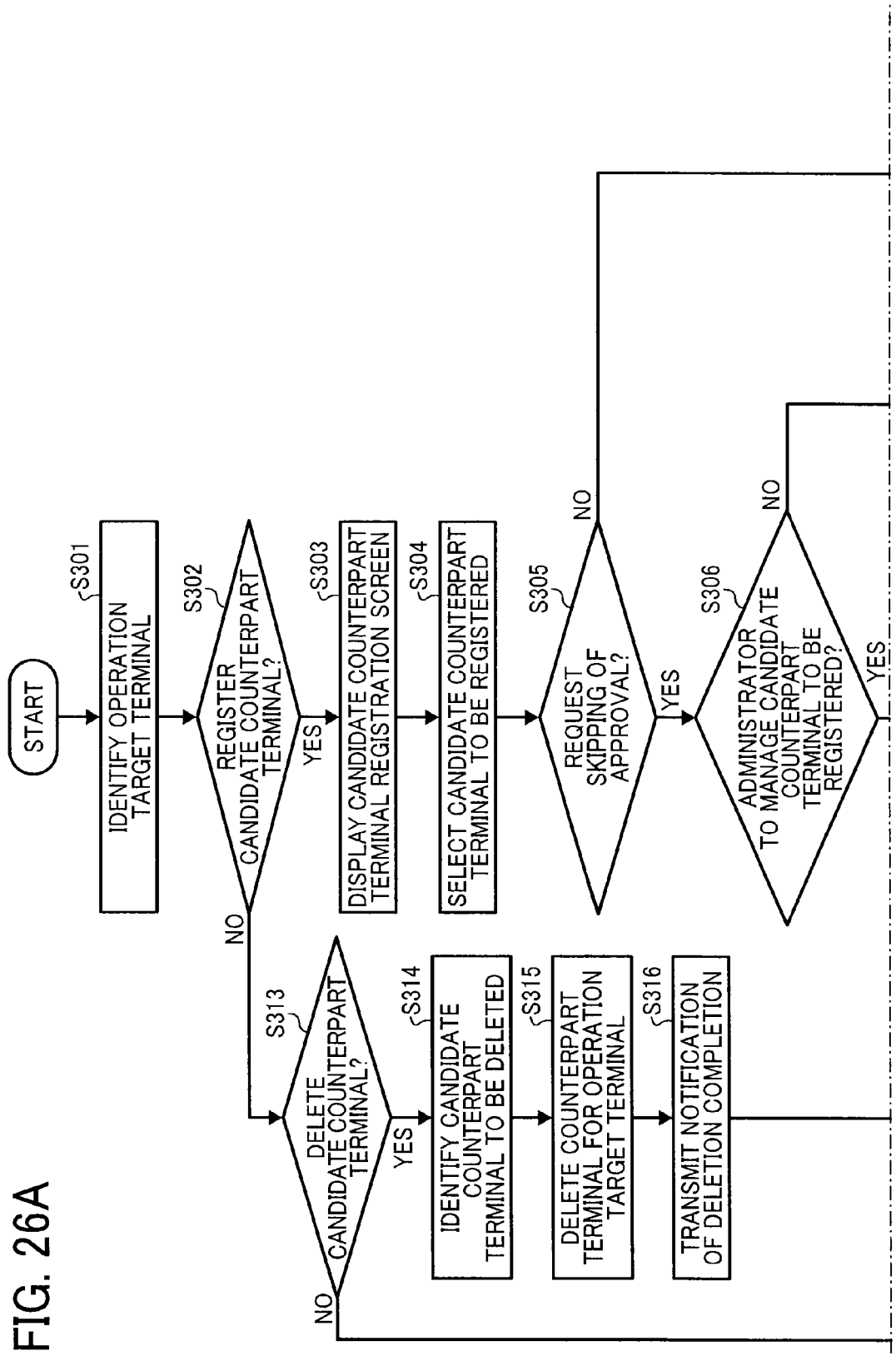
FIGS. 26A and 26B are a flowchart illustrating a candidate counterpart terminal registration and deletion process.
Figure 26B:
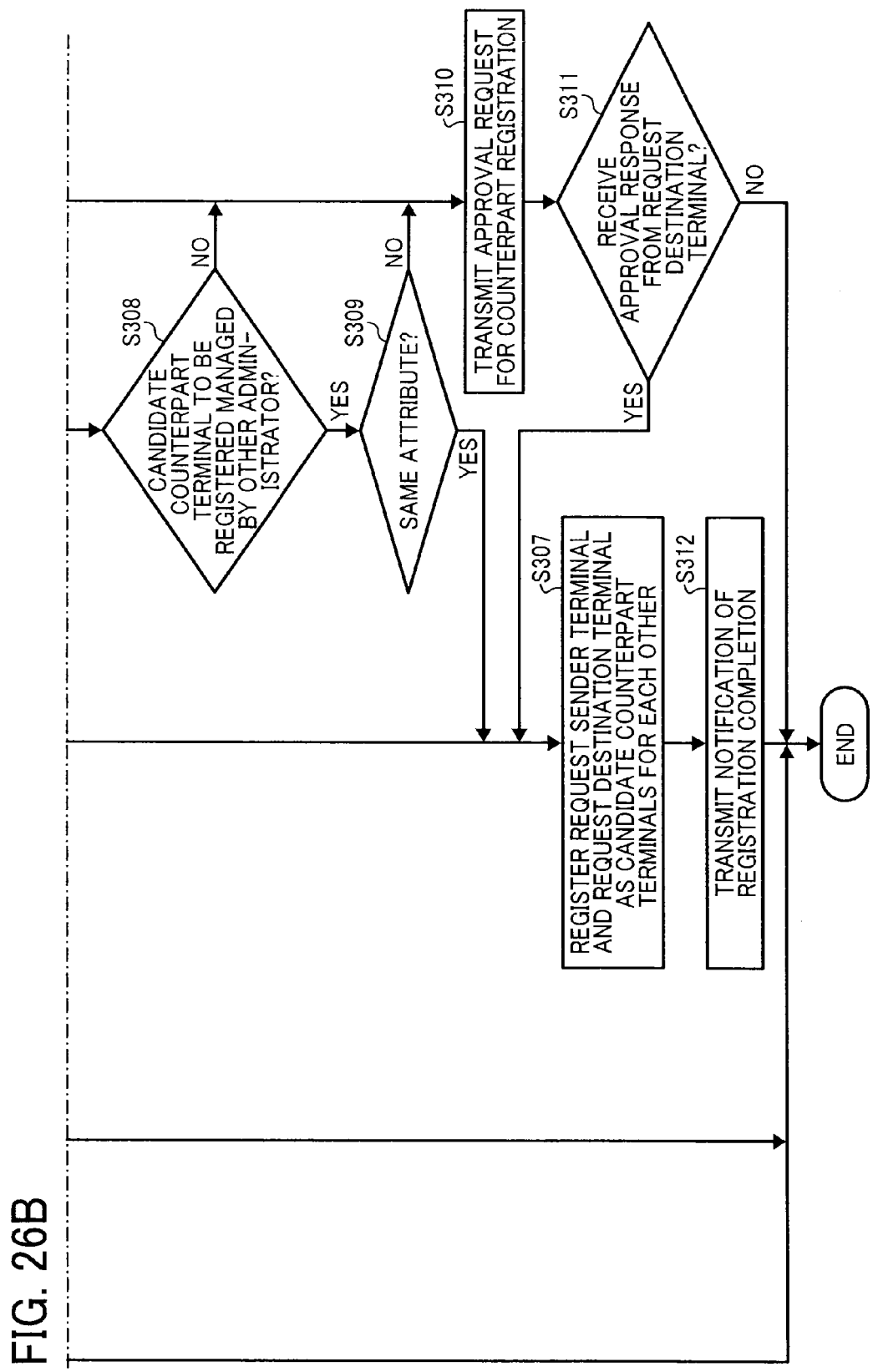

Next, referring to FIGS. 22 to 24 and 26, the candidate counterpart terminal registration and deletion process will be described. FIG. 22 is a conceptual diagram of a candidate counterpart terminal registration screen. FIGS. 23 and 24 are conceptual diagrams of a candidate counterpart terminal deletion screen. FIGS. 26A and 26B (FIG. 26) are a flowchart illustrating the candidate counterpart terminal registration and deletion process. Here, the example (pattern 3) illustrated in FIG. 15 will be described.

Referring to FIG. 26, the first determiner 87 accepts, from the administrator terminal 20*a* operated by the administrator A, a request of a request sender terminal to register or delete a request destination terminal among management terminals under management of the administrator A, and specifies the request sender terminal (step S301). Specifically, the administrator A checks the check box of a transmission terminal 10 (terminal ID) that the administrator A wants to use as a request sender terminal, on the management terminal list screen illustrated in FIG. 19, and presses the "register candidate counterpart terminal" button, thereby specifying a request sender terminal that desires to register a candidate counterpart terminal. In addition, the administrator A checks the check box of a transmission terminal 10 (terminal ID) that the administrator A wants to use as a request sender terminal, on the management terminal list screen illustrated in FIG. 19, and presses the "delete candidate counterpart terminal" button, thereby specifying a request sender terminal that desires to delete a candidate counterpart terminal.

Next, the first determiner 87 determines whether an operation, such as pressing, accepted from the administrator terminal 20*a* is an operation indicating registration of a candidate counterpart terminal (step S302). For example, the first determiner 87 determines whether the "register candidate counterpart terminal" button on the management terminal list screen illustrated in FIG. 19 has been pressed. In the case where the operation is not an operation indicating registration of a candidate counterpart terminal (No in step S302), the process proceeds to step S313. In the case where the operation is an operation indicating registration of a candidate counterpart terminal (Yes in step S302), the display control 83 transmits, via the first communicator 81, data of a candidate counterpart terminal registration screen such as the screen illustrated in FIG. 22 to the administrator terminal 20*a*, and the administrator terminal 20*a* displays the candidate counterpart terminal registration screen (step S303).

As illustrated in FIG. 22, on the candidate counterpart terminal registration screen, a plurality of "registration terminal ID" input fields for inputting the terminal ID of a transmission terminal 10 desired to be newly registered as a candidate counterpart terminal are displayed. In addition, for each registration terminal ID, as indicated in ST 12 of FIG. 13, a check box is displayed as an item for selecting whether to skip giving an approval request for asking a request destination terminal whether it is permitted to register the request destination terminal as a candidate counterpart terminal in a candidate list of a request sender terminal.

Next, referring back to FIG. 26, when the administrator A inputs a desired terminal ID in one of the "registration terminal ID" input fields on the candidate counterpart terminal registration screen illustrated in FIG. 22 and presses a "register" button, selection of a transmission terminal 10 requested to be registered as a candidate counterpart terminal is accepted (step S304). The terminal ID of the transmission terminal 10, which is requested to be registered, is transmitted from the counterpart registration system 80 to the terminal management system 50. More specifically, the first communicator 81 of the counterpart registration system 80 transmits a candidate counterpart terminal registration request to the second communicator 51 of the terminal management system 50. This registration request includes the terminal ID of a request sender terminal that gives a request to register a candidate counterpart terminal (the request sender terminal specified in step S301), the terminal ID of a request destination terminal requested to be registered as a candidate counterpart terminal (a request destination terminal indicated by the terminal ID input on the screen illustrated in FIG. 22), and the administrator ID of the administrator who is currently logged in. In addition, in the case where the skip approval check box of each registration terminal ID on the candidate counterpart terminal registration screen illustrated in FIG. 22 has been checked, a registration request includes approval request skipping requesting information indicating a request to skip an approval request for registration to the request destination terminal.

Next, the second determiner 59 of the terminal management system 50 determines, for each request destination terminal that may be registered as a candidate counterpart terminal on the basis of the received registration request, whether skipping of an approval process has been requested (step S305). Specifically, in the case where the received registration request includes approval request skipping requesting information, the second determiner 59 determines that it is unnecessary to request approval from a request destination terminal checked in a corresponding one of the check boxes illustrated in FIG. 22, and determines that it is necessary to request approval from a request destination terminal checked in a corresponding one of the above-mentioned check boxes.

In the case where no check box is checked in FIG. 22, the second determiner 59 refers to the administrator DB 65, thereby determining whether the terminal ID (specific terminal ID) of a request destination terminal requested to be registered as a candidate counterpart terminal and the administrator ID (first administrator ID) are associated with each other (step S306). In the case where there is association (Yes in step S306), it means that an approval process is unnecessary, and the process proceeds to step S307. In the case where there is no association (No in step S306), the process proceeds to step S308 for further determination.

Next, in step S308, the second determiner 59 determines whether there is another administrator ID (second administrator ID) associated with the specific terminal ID in the administrator DB 65, thereby determining whether a candidate counterpart terminal to be registered is also managed by another administrator. In the case where there is another associated administrator ID (Yes in step S308), the second determiner 59 further determines whether first attribute information associated with the first administrator is identical to second attribute information associated with the second administrator ID in the administrator DB 65 (step S309). In the case where the first attribute information is identical to the second attribute information (Yes in step S309), the process proceeds to step S307. In addition, in the case where there is no another associated administrator ID in step S308 described above (No in step S308), or in the case where the first attribute information is not identical to the second attribute information in step S309 described above (No in step S309), the process proceeds to step S310.

Next, in step S310, the first communicator 81 of the counterpart registration system 80 transmits an approval request for counterpart registration to the transmission terminal 10 requested to be registered as a candidate counterpart terminal. More specifically, for example, this is realizable by a process such as that described below.

Specifically, in the case where it has been selected in step S305 not to skip approval, the request manager 58 of the terminal management system 50 additionally stores, in the request management DB 64, a new record in which the request sender terminal ID included in the received registration request and the request destination terminal ID are associated with each other. The second extractor 55 of the terminal management system 50 searches the terminal management DB 62 by using, as a search key, the terminal ID of the request destination terminal in the request management DB 64, thereby extracting corresponding operation state information. In the case where the operation state is capable of communicating (such as online (communication OK)), the second communicator 51 transmits an approval request for counterpart registration to the transmission terminal 10 which is capable of communicating. Note that, for the transmission terminal 10 whose operation state is incapable of communicating (such as offline), the second communicator 51 transmits an approval request when the operation state is updated to capable of communicating (such as online).

Next, after step S310, the second determiner 59 of the transmission management system 40 determines whether an approval response has been received from the request destination terminal, which has received the approval request (step S311). In the case where the second communicator 51 has received an approval response (Yes in step S311), the process proceeds to step S307. In step S307, the candidate list manager 57 registers, in the candidate list management DB 63, the terminal ID of the request destination terminal as a candidate counterpart terminal in the case where the request sender terminal becomes a starting terminal, and registers the terminal ID of the request sender terminal as a candidate counterpart terminal in the case where the request destination terminal becomes a starting terminal (step S307). That is, the request sender terminal and the request destination terminal are both registered as candidate counterpart terminals for each other. In step S307, instead of registering the request sender terminal and the request destination terminal as candidate counterpart terminals for each other, only the terminal ID of the request destination terminal may be registered as a candidate counterpart terminal for the request sender terminal.

In the case of completion of registration, the second communicator 51 transmits a notification of registration completion to the request sender terminal and the request destination terminal (step S312). When the above process is completed, the request manager 58 of the terminal management system 50 deletes the record whose registration is completed, from the request management DB 64. In the case where there is no request for skipping approval in step S305 (No in step S305), deletion is unnecessary since no new record has been added to the request management DB 64 for a pair of the terminal ID of the request sender terminal and the terminal ID of the request destination terminal.

Even in the case where the determination is negative in step S305, step S306 may be executed. In this case, step S307 can be executed regardless of whether there is a response to an approval request for registering a candidate counterpart terminal or whether that response indicates approval.

Next, a candidate counterpart terminal deletion process will be described.

In the case where the determination is negative in step S302 described above, the first determiner 87 determines whether the operation is an operation indicating deletion of a candidate counterpart terminal (step S313). Specifically, the first determiner 87 determines whether the first communicator 81 has received a candidate counterpart terminal deletion request from the administrator terminal 20, in response to pressing of the "delete candidate counterpart terminal" button on the management terminal list screen illustrated in FIG. 19. In this case, a candidate counterpart terminal to be deleted is a candidate counterpart terminal for a transmission terminal 10 whose checkbox (CA, C1 to CN) has been checked on the management terminal list screen.

In the case where the operation is not an operation indicating deletion of a candidate counterpart terminal (No in step S313), the process illustrated in FIG. 26 ends. In the case where the operation is an operation indicating deletion of a candidate counterpart terminal (Yes in step S313), the screen data generator 86 displays, via the first communicator 81, a candidate counterpart terminal deletion screen such as that illustrated in FIG. 23 or 24 on the administrator terminal 20, and the first determiner 87 identifies a candidate counterpart terminal to be deleted, on the basis of a terminal ID selected and input by the administrator (step S314). Note that FIGS. 23 and 24 are conceptual diagrams of a candidate counterpart terminal deletion screen.

Here, step S314 will be described in more detail using FIGS. 23 and 24. On the candidate counterpart terminal deletion screen illustrated in FIGS. 23 and 24, a radio button selected to "delete all candidate counterpart terminals" and a radio button selected to "delete a selected candidate counterpart terminal" are displayed. In addition, on the candidate counterpart terminal deletion screen, a plurality of "deletion terminal ID" input fields for inputting the terminal ID of a candidate counterpart terminal that the administrator wants to delete, a "delete" button pressed when executing deletion, and a "cancel" button pressed when canceling deletion are displayed.

FIG. 23 illustrates a state in which the administrator presses the radio button "delete a selected candidate counterpart terminal", and the terminal ID "01ca" of a candidate counterpart terminal is input in one of the "deletion terminal ID" input fields. FIG. 24 illustrates a state in which the radio button "delete all candidate counterpart terminals" is pressed. In the case illustrated in FIG. 24, since all candidate counterpart terminals are to be deleted, the "deletion terminal ID" input fields are shaded, and the administrator is incapable of inputting a terminal ID.

Here, the third pattern illustrated in FIG. 15 will be described. Specifically, the case will be described below in which, after the administrator A checks the check box CA on the management terminal list screen illustrated in FIG. 19 and presses the "delete candidate counterpart terminal" button, further the administrator A presses the radio button "delete a selected candidate counterpart terminal" illustrated in FIG.

23, inputs the terminal ID "01ca." in one of the "deletion terminal ID" input fields, and presses the "delete" button at last.

In this case, in the candidate list management DB 63, because starting terminals that have the terminal ID "01ca" as a candidate counterpart terminal are starting terminals indicated by the terminal ID "01aa" and the terminal ID "01ab", it means that the administrator A has selected request sender terminals (10*aa* and 10*ab*) indicated by the terminal ID "01aa" and the terminal ID "01ab". It also means that the administrator A has given, by using the administrator terminal 20*a*, a request for deletion of a candidate counterpart terminal indicated by the terminal ID "01ca", from candidate counterpart terminals for each of the starting terminals indicated by the terminal ID "01aa" and the terminal ID "01ab". Accordingly, the first communicator 81 receives a candidate counterpart terminal deletion request from the administrator terminal 20, and the first determiner 87 specifies transmission terminals (10*aa* and 10*ab*) indicated by the terminal ID "01aa" and the terminal ID "01ab" as starting terminals, and specifies the transmission terminal 10*ca* indicated by the terminal ID "01ca" as a candidate counterpart terminal to be deleted.

Next, the data reader 84 deletes the terminal ID "01ca" from the terminal ID of a candidate counterpart terminal in each of records in which the terminal IDs of the starting terminals in the candidate list management DB 63 are "01aa" and "01ab", on the basis of the deletion request received via the first communicator 81 by the second communicator 51 (step S315). Accordingly, the second communicator 51 transmits, to the request sender terminals (transmission terminals (10*aa* and 10*ab*)) and the request destination terminal (transmission terminal 10*ca*), a notification of deletion completion indicating counterpart deletion has been completed (step S316).

In step S315, the terminal IDs "01aa" and "01ab" may be additionally deleted from the terminal ID of a candidate counterpart terminal in a record in which the terminal ID of a starting terminal is "01ca".

As has been described above, according to the embodiment, even in the case where the transmission management system 40 manages the candidate list management DB 63, a desired candidate counterpart terminal can be deleted from the candidate list management DB 63.

Further, the terminal IDs of a plurality of or all candidate counterpart terminals can be collectively deleted from candidate counterpart terminals for a plurality of or all starting terminals in the candidate list management DB 63. Accordingly, the user of each starting terminal (transmission terminal 10) can be exempted from deleting the terminal IDs of a plurality of or all candidate counterpart terminals.

Referring to FIGS. 27A and 27B (FIG. 27), another example of the administrator DB 65 will be described. The administrator DB 65 of FIG. 27 includes two tables. That is, as illustrated in FIG. 27A, an administrator ID, a password, an administrator email address, and attribute information are associated with one another and managed as a first table. In addition, as illustrated in FIG. 27B, an administrator ID and a management terminal ID are associated with each other and managed as a second table. In this manner, the information illustrated in FIG. 27 corresponds to the association information managed using the DB of FIG. 12. Since an administrator ID, a password, a terminal ID, an administrator email address, and attribute information have the same contents as those in the case of FIG. 12, descriptions thereof are omitted.

Note that, in the above-described embodiments, at least one of the processing in step S306 and the processing in step S308 may be omitted.

In addition, the transmission management system 40 is applicable to an arbitrary system when the system is a communication system in which transmission terminals 10 are capable of communicating with each other. For example, the transmission management system 40 is applicable to a teleconference system, a videoconference system, an audio conference system, an audio phone system (including a mobile phone system), a text chat system, or a whiteboard sharing system. In addition, transmission terminals 10 may be dedicated terminals for the above-described communication system or game-dedicated terminals, or may be general terminals such as personal computers, smart phones, mobile phone terminals, or tablet terminals. In addition, it is sufficient for the terminal management system 50 and the counterpart registration system 80 to be information processing apparatuses including the functional blocks illustrated by way of example in FIG. 7, and the terminal management system 50 and the counterpart registration system 80 may be dedicated server apparatuses or general terminal apparatuses.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device. The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A transmission management system, comprising:
a memory that stores, for each one of a plurality of starting terminals, starting terminal identification information identifying the starting terminal capable of requesting to start communication with one or more candidate counterpart terminals, in association with candidate counterpart terminal identification information identifying each one of the one or more candidate counterpart terminals;
a receiver that receives a request for deleting at least one candidate counterpart terminal selected from the one or more candidate counterpart terminals, for at least one starting terminal selected from the plurality of starting terminals; and
processing circuitry that specifies selected candidate counterpart terminal identification information of the selected candidate counterpart terminal, and deletes the selected candidate counterpart terminal identification information of the selected candidate counterpart terminal from the candidate counterpart terminal identification information identifying the one or more candidate counterpart terminals stored in association with the starting terminal identification information of the selected starting terminal in the memory.

2. The transmission management system of claim 1, wherein
the processing circuitry further obtains selected starting terminal identification information of the selected starting terminal, and obtains the selected candidate counterpart terminal identification information of the selected candidate counterpart terminal using the obtained selected starting terminal identification information.

3. The management system of claim 1, further comprising:
a transmitter that sends information indicating completion of deletion of the selected candidate counterpart terminal identification information of the selected candidate counterpart terminal, to the selected candidate counterpart terminal.

4. The management system of claim 2, further comprising:
a transmitter that sends information indicating completion of deletion of the selected candidate counterpart terminal identification information of the selected candidate counterpart terminal, to the selected starting terminal.

5. The transmission management system of claim 2, wherein, when the selected starting terminal includes a plurality of selected starting terminals,
the processing circuitry deletes the selected candidate counterpart terminal identification information of the selected candidate counterpart terminal, respectively, from the candidate counterpart terminal identification information identifying the one or more candidate counterpart terminals stored in association with the starting terminal identification information of the plurality of selected starting terminals.

6. The transmission management system of claim 2, wherein, when the selected starting terminal includes all of the plurality of starting terminals of the association information,
the processing circuitry specifies one or more of all of the plurality of starting terminals associated with the selected candidate counterpart terminal, and deletes the selected candidate counterpart terminal identification information of the selected candidate counterpart terminal, respectively, from the candidate counterpart terminal identification information identifying the one or more candidate counterpart terminals stored in association with the starting terminal identification information of the specified one or more of all of the plurality of starting terminals.

7. The transmission management system of claim 1, wherein, when the selected candidate counterpart terminal includes a plurality of selected candidate counterpart terminals,
the processing circuitry deletes the candidate counterpart terminal identification information identifying the plurality of selected candidate counterpart terminals, from the candidate counterpart terminal identification information identifying the one or more candidate counterpart terminals stored in association with the starting terminal identification information of the selected starting terminal.

8. The transmission management system of claim 1, wherein, when the selected candidate counterpart terminal includes all of the one or more candidate counterpart terminals,
the processing circuitry deletes of the candidate counterpart terminal identification information identifying the one or more candidate counterpart terminals, from the candidate counterpart terminal identification information identifying the one or more candidate counterpart terminals stored in association with the starting terminal identification information of the selected starting terminal.

9. The management system of claim 5, wherein the processing circuitry deletes the selected candidate counterpart terminal identification information of the selected candidate counterpart terminal, respectively, from the candidate counterpart terminal identification information identifying the one or more candidate counterpart terminals stored in association with the starting terminal identification information of the plurality of selected starting terminals, at once.

10. The management system of claim 7, wherein the processing circuitry deletes the candidate counterpart terminal identification information identifying the plurality of selected candidate counterpart terminals, from the candidate counterpart terminal identification information identifying the one or more candidate counterpart terminals stored in association with the starting terminal identification information of the selected starting terminal, at once.

11. A system, comprising:
the transmission management system of claim 1; and
a plurality of terminals, managed by the transmission management system as at least one of the starting terminal and the candidate counterpart terminal.

12. A system, comprising:
the transmission management system of claim 1; and
a terminal configured to receive an input that requests to delete the selected candidate counterpart terminal, for the starting terminal.

13. A method of managing association information, comprising:
storing in a memory, for each one of a plurality of starting terminals, starting terminal identification information identifying the starting terminal capable of requesting to start communication with one or more candidate counterpart terminals, in association with candidate counterpart terminal identification information identifying each one of the one or more candidate counterpart terminals;

receiving a request for deleting at least one candidate counterpart terminal selected from the one or more candidate counterpart terminals, for at least one starting terminal selected from the plurality of starting terminals;

specifying selected candidate counterpart terminal identification information of the selected candidate counterpart terminal; and deleting the selected candidate counterpart terminal identification information of the selected candidate counterpart terminal, from the candidate counterpart terminal identification information identifying the one or more candidate counterpart terminals stored in association with the starting terminal identification information of the selected starting terminal in the memory.

14. The method of claim 13, further comprising:

obtaining selected starting terminal identification information of the selected starting terminal, and obtaining the selected candidate counterpart terminal identification information of the selected candidate counterpart terminal using the obtained selected starting terminal identification information.

15. The method of claim 14, further comprising:

sending information indicating completion of deletion of the selected candidate counterpart terminal identification information of the selected candidate counterpart terminal, to at least one of the selected candidate counterpart terminal and the selected starting terminal.

16. The method of claim 14, wherein, when the selected starting terminal includes a plurality of selected starting terminals, the step of deleting deletes the selected candidate counterpart terminal identification information of the selected candidate counterpart respectively, from the candidate counterpart terminal identification information identifying the one or more candidate counterpart terminals stored in association with the starting terminal identification information of the plurality of selected starting terminals.

17. The method of claim 14, wherein, when the selected starting terminal includes all of the plurality of starting terminals of the association information, the method further comprising:

specifying one or more of all of the plurality of starting terminals associated with the selected candidate counterpart terminal, wherein the step of deleting deletes the selected candidate counterpart terminal identification information of the selected candidate counterpart terminal, respectively, from the candidate counterpart terminal identification information identifying the one or more candidate counterpart terminals stored in association with the starting terminal identification information of the specified one or more of all of the plurality of starting terminals.

18. The method of claim 13, wherein, when the selected candidate counterpart terminal includes a plurality of selected candidate counterpart terminals, the step of deleting deletes the candidate counterpart terminal identification information identifying the plurality of selected candidate counterpart terminals, from the candidate counterpart terminal identification information identifying the one or more candidate counterpart terminals stored in association with the starting terminal identification information of the selected starting terminal.

19. The method of claim 13, wherein the step of deleting deletes the candidate counterpart terminal identification information of the selected candidate counterpart terminal, respectively, from the candidate counterpart terminal identification information identifying the one or more candidate counterpart terminals stored in association with the starting terminal identification information of the plurality of selected starting terminals, at once.

20. A non-transitory recording medium storing a plurality of instructions which, when executed by a processor, cause the processor to perform a method of managing association information, comprising:

storing in a memory, for each one of a plurality of starting terminals, starting terminal identification information identifying the starting terminal capable of requesting to start communication with one or more candidate counterpart terminals, in association with candidate counterpart terminal identification information identifying each one of the one or more candidate counterpart terminals;

receiving a request for deleting at least one candidate counterpart terminal selected from the one or more candidate counterpart terminals, for at least one starting terminal selected from the plurality of starting terminals;

specifying selected candidate counterpart terminal identification information of the selected candidate counterpart terminal; and deleting the selected candidate counterpart terminal identification information of the selected candidate counterpart terminal, from the candidate counterpart terminal identification information identifying the one or more candidate counterpart terminals stored in association with the starting terminal identification information of the selected starting terminal in the memory.

* * * * *